(12) United States Patent
Holz

(10) Patent No.: US 12,154,238 B2
(45) Date of Patent: *Nov. 26, 2024

(54) WEARABLE AUGMENTED REALITY DEVICES WITH OBJECT DETECTION AND TRACKING

(71) Applicant: ULTRAHAPTICS IP TWO LIMITED, Bristol (GB)

(72) Inventor: David S. Holz, San Francisco, CA (US)

(73) Assignee: ULTRAHAPTICS IP TWO LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,663

(22) Filed: Jun. 8, 2023

(65) Prior Publication Data
US 2023/0334796 A1  Oct. 19, 2023

Related U.S. Application Data

(63) Continuation of application No. 17/384,699, filed on Jul. 23, 2021, now Pat. No. 11,676,349, which is a
(Continued)

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ................ G06T 19/006; G02B 27/017; G02B 27/0172; G02B 2027/0138;
(Continued)

(56) References Cited

U.S. PATENT DOCUMENTS 2,665,041 A   1/1954 Maffucci
4,175,862 A   11/1979 DiMatteo et al.
(Continued)

FOREIGN PATENT DOCUMENTS

CN   1984236 A   6/2007
CN   101124534 A   2/2008
(Continued)

OTHER PUBLICATIONS

U.S. Appl. No. 14/718,002, filed May 20, 2015, U.S. Pat. No. 9,741,169, Aug. 22, 2017, Issued.
(Continued)

*Primary Examiner* — Maurice L. McDowell, Jr.
(74) *Attorney, Agent, or Firm* — HAYNES BEFFEL & WOLFELD LLP; Andrew L. Dunlap; Paul A. Durdik

(57) ABSTRACT

The technology disclosed can provide capabilities to view and/or interact with the real world to the user of a wearable (or portable) device using a sensor configured to capture motion and/or determining the path of an object based on imaging, acoustic or vibrational waves. Implementations can enable improved user experience, greater safety, greater functionality to users of virtual reality for machine control and/or machine communications applications using wearable (or portable) devices, e.g., head mounted devices (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection.

18 Claims, 20 Drawing Sheets

Related U.S. Application Data continuation of application No. 16/823,294, filed on Mar. 18, 2020, now Pat. No. 11,080,937, which is a continuation of application No. 15/681,251, filed on Aug. 18, 2017, now Pat. No. 10,600,248, which is a continuation of application No. 14/718,002, filed on May 20, 2015, now Pat. No. 9,741,169.

(60) Provisional application No. 62/001,044, filed on May 20, 2014.

(51) Int. Cl.
    *G06F 3/01*         (2006.01)
    *G06F 3/147*       (2006.01)
    *G09G 5/18*        (2006.01)

(52) U.S. Cl.
    CPC .............. *G06F 3/011* (2013.01); *G06F 3/017* (2013.01); *G06F 3/147* (2013.01); *G09G 5/18* (2013.01); *G02B 2027/0138* (2013.01); *G02B 2027/014* (2013.01); *G02B 2027/0178* (2013.01); *G02B 2027/0187* (2013.01); *G09G 2340/0464* (2013.01); *G09G 2340/125* (2013.01); *G09G 2354/00* (2013.01); *G09G 2360/144* (2013.01)

(58) Field of Classification Search
    CPC ...... G02B 2027/014; G02B 2027/0178; G02B 2027/0187; G06F 3/011; G06F 3/017; G06F 3/147; G09G 5/18; G09G 2340/0464; G09G 2340/125; G09G 2354/00; G09G 2360/144
    See application file for complete search history.

(56) References Cited

U.S. PATENT DOCUMENTS

| | | | |
|---|---|---|---|
| 4,521,831 A | 6/1985 | Thayer | |
| 4,734,939 A | 4/1988 | Copp | |
| 4,876,455 A | 10/1989 | Sanderson et al. | |
| 4,879,659 A | 11/1989 | Bowlin et al. | |
| 4,893,223 A | 1/1990 | Arnold | |
| 5,038,258 A | 8/1991 | Koch et al. | |
| 5,134,661 A | 7/1992 | Reinsch | |
| 5,282,067 A | 1/1994 | Liu | |
| 5,434,617 A | 7/1995 | Bianchi | |
| 5,454,043 A | 9/1995 | Freeman | |
| 5,574,511 A | 11/1996 | Yang et al. | |
| 5,581,276 A | 12/1996 | Cipolla et al. | |
| 5,594,469 A | 1/1997 | Freeman et al. | |
| 5,659,475 A | 8/1997 | Brown | |
| 5,691,737 A | 11/1997 | Ito et al. | |
| 5,742,263 A | 4/1998 | Wang et al. | |
| 5,900,849 A | 5/1999 | Gallery | |
| 5,900,863 A | 5/1999 | Numazaki | |
| 5,940,538 A | 8/1999 | Spiegel et al. | |
| 6,002,808 A | 12/1999 | Freeman | |
| 6,031,161 A | 2/2000 | Baltenberger | |
| 6,031,661 A | 2/2000 | Tanaami | |
| 6,072,494 A | 6/2000 | Nguyen | |
| 6,075,895 A | 6/2000 | Qiao et al. | |
| 6,147,678 A | 11/2000 | Kumar et al. | |
| 6,154,558 A | 11/2000 | Hsieh | |
| 6,181,343 B1 | 1/2001 | Lyons | |
| 6,184,326 B1 | 2/2001 | Razavi et al. | |
| 6,184,926 B1 | 2/2001 | Khosravi et al. | |
| 6,195,104 B1 | 2/2001 | Lyons | |
| 6,204,852 B1 | 3/2001 | Kumar et al. | |
| 6,252,598 B1 | 6/2001 | Segen | |
| 6,263,091 B1 | 7/2001 | Jain et al. | |
| 6,346,933 B1 | 2/2002 | Lin | |
| 6,417,970 B1 | 7/2002 | Travers et al. | |
| 6,421,453 B1 | 7/2002 | Kanevsky et al. | |
| 6,463,402 B1 | 10/2002 | Bennett et al. | |
| 6,492,986 B1 | 12/2002 | Metaxas et al. | |
| 6,493,041 B1 | 12/2002 | Hanko et al. | |
| 6,498,628 B2 | 12/2002 | Iwamura | |
| 6,578,203 B1 | 6/2003 | Anderson, Jr. et al. | |
| 6,603,867 B1 | 8/2003 | Sugino et al. | |
| 6,661,918 B1 | 12/2003 | Gordon et al. | |
| 6,674,877 B1 | 1/2004 | Jojic et al. | |
| 6,702,494 B2 | 3/2004 | Dumler et al. | |
| 6,734,911 B1 | 5/2004 | Lyons | |
| 6,738,424 B1 | 5/2004 | Allmen et al. | |
| 6,771,294 B1 | 8/2004 | Pulli et al. | |
| 6,798,628 B1 | 9/2004 | Macbeth | |
| 6,804,654 B2 | 10/2004 | Kobylevsky et al. | |
| 6,804,656 B1 | 10/2004 | Rosenfeld et al. | |
| 6,814,656 B2 | 11/2004 | Rodriguez | |
| 6,819,796 B2 | 11/2004 | Hong et al. | |
| 6,901,170 B1 | 5/2005 | Terada et al. | |
| 6,919,880 B2 | 7/2005 | Morrison et al. | |
| 6,950,534 B2 | 9/2005 | Cohen et al. | |
| 6,993,157 B1 | 1/2006 | Oue et al. | |
| 7,050,606 B2 | 5/2006 | Paul et al. | |
| 7,152,024 B2 | 12/2006 | Marschner et al. | |
| 7,213,707 B2 | 5/2007 | Hubbs et al. | |
| 7,215,828 B2 | 5/2007 | Luo | |
| 7,236,611 B2 | 6/2007 | Roberts et al. | |
| 7,244,233 B2 | 7/2007 | Krantz et al. | |
| 7,257,237 B1 | 8/2007 | Luck et al. | |
| 7,259,873 B2 | 8/2007 | Sikora et al. | |
| D552,152 S | 10/2007 | Almond | |
| 7,289,645 B2 | 10/2007 | Yamamoto et al. | |
| 7,308,112 B2 | 12/2007 | Fujimura et al. | |
| 7,340,077 B2 | 3/2008 | Gokturk et al. | |
| 7,483,049 B2 | 1/2009 | Aman et al. | |
| 7,519,223 B2 | 4/2009 | Dehlin et al. | |
| 7,532,206 B2 | 5/2009 | Morrison et al. | |
| 7,536,032 B2 | 5/2009 | Bell | |
| 7,542,586 B2 | 6/2009 | Johnson | |
| 7,598,942 B2 | 10/2009 | Underkoffler et al. | |
| 7,606,417 B2 | 10/2009 | Steinberg et al. | |
| 7,646,372 B2 | 1/2010 | Marks et al. | |
| 7,656,372 B2 | 2/2010 | Sato et al. | |
| 7,665,041 B2 | 2/2010 | Wilson et al. | |
| 7,692,625 B2 | 4/2010 | Morrison et al. | |
| 7,743,348 B2 | 6/2010 | Robbins et al. | |
| D620,514 S | 7/2010 | Kim et al. | |
| D627,815 S | 11/2010 | Oba | |
| 7,831,932 B2 | 11/2010 | Josephsoon et al. | |
| 7,840,031 B2 | 11/2010 | Albertson et al. | |
| 7,861,188 B2 | 12/2010 | Josephsoon et al. | |
| 7,940,885 B2 | 5/2011 | Stanton et al. | |
| 7,948,493 B2 | 5/2011 | Klefenz et al. | |
| 7,961,174 B1 | 6/2011 | Markovic et al. | |
| 7,961,934 B2 | 6/2011 | Thrun et al. | |
| 7,971,156 B2 | 6/2011 | Albertson et al. | |
| 7,980,885 B2 | 7/2011 | Gattwinkel et al. | |
| 8,023,698 B2 | 9/2011 | Niwa et al. | |
| 8,035,624 B2 | 10/2011 | Bell et al. | |
| 8,045,825 B2 | 10/2011 | Shimoyama et al. | |
| 8,064,704 B2 | 11/2011 | Kim et al. | |
| 8,085,339 B2 | 12/2011 | Marks | |
| 8,086,971 B2 | 12/2011 | Radivojevic et al. | |
| 8,111,239 B2 | 2/2012 | Pryor et al. | |
| 8,112,719 B2 | 2/2012 | Hsu et al. | |
| 8,126,985 B1 | 2/2012 | Kandekar et al. | |
| D656,175 S | 3/2012 | Fong | |
| 8,144,233 B2 | 3/2012 | Fukuyama | |
| 8,185,176 B2 | 5/2012 | Mangat et al. | |
| 8,213,707 B2 | 7/2012 | Li et al. | |
| 8,218,858 B2 | 7/2012 | Gu | |
| 8,229,134 B2 | 7/2012 | Duraiswami et al. | |
| 8,235,529 B1 | 8/2012 | Raffle et al. | |
| 8,244,233 B2 | 8/2012 | Chang et al. | |
| 8,249,345 B2 | 8/2012 | Wu et al. | |
| 8,270,669 B2 | 9/2012 | Aichi et al. | |
| 8,289,162 B2 | 10/2012 | Mooring et al. | |
| 8,290,208 B2 | 10/2012 | Kurtz et al. | |
| 8,304,727 B2 | 11/2012 | Lee et al. | |
| 8,319,832 B2 | 11/2012 | Nagata et al. | |

(56) References Cited

U.S. PATENT DOCUMENTS

| | | |
|---|---|---|
| 8,363,010 B2 | 1/2013 | Nagata |
| 8,375,473 B2 | 2/2013 | Celona et al. |
| 8,395,600 B2 | 3/2013 | Kawashima et al. |
| 8,396,252 B2 | 3/2013 | El Dokor |
| 8,432,377 B2 | 4/2013 | Newton |
| 8,471,848 B2 | 6/2013 | Tschesnok |
| 8,514,221 B2 | 8/2013 | King et al. |
| D689,539 S | 9/2013 | Zaletel et al. |
| 8,542,320 B2 | 9/2013 | Berestov et al. |
| 8,553,037 B2 | 10/2013 | Smith et al. |
| 8,582,809 B2 | 11/2013 | Halimeh et al. |
| 8,593,417 B2 | 11/2013 | Kawashima et al. |
| 8,605,202 B2 | 12/2013 | Muijs et al. |
| 8,631,355 B2 | 1/2014 | Murillo et al. |
| 8,638,989 B2 | 1/2014 | Holz |
| 8,659,594 B2 | 2/2014 | Kim et al. |
| 8,659,658 B2 | 2/2014 | Vassigh et al. |
| 8,661,571 B1 | 3/2014 | Teetzel et al. |
| 8,693,731 B2 | 4/2014 | Holz et al. |
| 8,738,523 B1 | 5/2014 | Sanchez et al. |
| 8,744,122 B2 | 6/2014 | Salgian et al. |
| 8,744,645 B1 | 6/2014 | Vaghefinazari et al. |
| 8,751,979 B1 | 6/2014 | Socha |
| 8,768,022 B2 | 7/2014 | Miga et al. |
| 8,773,512 B1 | 7/2014 | Rafii |
| 8,781,171 B2 | 7/2014 | King et al. |
| 8,781,234 B2 | 7/2014 | Zhang et al. |
| 8,817,087 B2 | 8/2014 | Weng et al. |
| 8,824,749 B2 | 9/2014 | Leyvand et al. |
| 8,842,084 B2 | 9/2014 | Andersson et al. |
| 8,843,857 B2 | 9/2014 | Berkes et al. |
| 8,872,914 B2 | 10/2014 | Gobush |
| D717,361 S | 11/2014 | Nikaido |
| 8,878,749 B1 | 11/2014 | Wu et al. |
| 8,891,868 B1 | 11/2014 | Ivanchenko |
| 8,907,982 B2 | 12/2014 | Zontrop et al. |
| 8,922,590 B1 | 12/2014 | Luckett, Jr. et al. |
| 8,929,609 B2 | 1/2015 | Padovani et al. |
| 8,930,852 B2 | 1/2015 | Chen et al. |
| 8,942,881 B2 | 1/2015 | Hobbs et al. |
| 8,954,340 B1 | 2/2015 | Sanchez et al. |
| 8,957,857 B2 | 2/2015 | Lee et al. |
| 9,014,414 B2 | 4/2015 | Katano et al. |
| 9,056,396 B1 | 6/2015 | Linnell |
| 9,070,019 B2 | 6/2015 | Holz |
| 9,119,670 B2 | 9/2015 | Yang et al. |
| 9,122,354 B2 | 9/2015 | Sharma |
| 9,124,778 B1 | 9/2015 | Crabtree |
| 9,170,674 B2 | 10/2015 | Forutanpour et al. |
| 9,213,185 B1 | 12/2015 | Starner et al. |
| 9,274,742 B2 | 3/2016 | Phillips |
| D756,443 S | 5/2016 | Ju et al. |
| 9,459,697 B2 | 10/2016 | Bedikian et al. |
| 9,600,935 B2 | 3/2017 | Cohen |
| 9,741,169 B1 | 8/2017 | Holz |
| 9,754,167 B1 | 9/2017 | Holz et al. |
| 9,766,855 B2 | 9/2017 | Lapidot et al. |
| 9,868,449 B1 | 1/2018 | Holz et al. |
| 10,043,320 B2 | 8/2018 | Holz et al. |
| 10,318,100 B2 | 6/2019 | Abercrombie et al. |
| 10,475,249 B2 | 11/2019 | Holz et al. |
| 10,600,248 B2 * | 3/2020 | Holz .................. G02B 27/0172 |
| 11,080,937 B2 * | 8/2021 | Holz .................. G02B 27/0172 |
| 11,538,224 B2 | 12/2022 | Holz et al. |
| 11,561,519 B2 | 1/2023 | Gordon et al. |
| 11,676,349 B2 * | 6/2023 | Holz .................. G02B 27/017 |
| | | 345/633 |
| 2001/0044858 A1 | 11/2001 | Rekimoto |
| 2001/0052985 A1 | 12/2001 | Ono |
| 2002/0008139 A1 | 1/2002 | Albertelli |
| 2002/0008211 A1 | 1/2002 | Kask |
| 2002/0041327 A1 | 4/2002 | Hildreth et al. |
| 2002/0080094 A1 | 6/2002 | Biocca et al. |
| 2002/0105484 A1 | 8/2002 | Navab et al. |
| 2002/0107637 A1 | 8/2002 | Okamura et al. |
| 2003/0053658 A1 | 3/2003 | Pavlidis |
| 2003/0053659 A1 | 3/2003 | Pavlidis et al. |
| 2003/0076996 A1 | 4/2003 | Neumann et al. |
| 2003/0081141 A1 | 5/2003 | Mazzapica |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0103111 A1 | 5/2004 | Miller et al. |
| 2004/0125228 A1 | 7/2004 | Dougherty |
| 2004/0125984 A1 | 7/2004 | Ito et al. |
| 2004/0145809 A1 | 7/2004 | Brenner |
| 2004/0155877 A1 | 8/2004 | Hong et al. |
| 2004/0212725 A1 | 10/2004 | Raskar |
| 2005/0007673 A1 | 1/2005 | Chaoulov et al. |
| 2005/0063564 A1 | 3/2005 | Yamamoto et al. |
| 2005/0068518 A1 | 3/2005 | Baney et al. |
| 2005/0094019 A1 | 5/2005 | Grosvenor et al. |
| 2005/0131607 A1 | 6/2005 | Breed |
| 2005/0156888 A1 | 7/2005 | Xie et al. |
| 2005/0168578 A1 | 8/2005 | Gobush |
| 2005/0210105 A1 | 9/2005 | Hirata et al. |
| 2005/0236558 A1 | 10/2005 | Nabeshima et al. |
| 2005/0238201 A1 | 10/2005 | Shamaie |
| 2006/0006235 A1 | 1/2006 | Kurzweil et al. |
| 2006/0017807 A1 | 1/2006 | Lee et al. |
| 2006/0028656 A1 | 2/2006 | Venkatesh et al. |
| 2006/0029296 A1 | 2/2006 | King et al. |
| 2006/0034545 A1 | 2/2006 | Mattes et al. |
| 2006/0050979 A1 | 3/2006 | Kawahara |
| 2006/0056056 A1 | 3/2006 | Ahiska et al. |
| 2006/0072105 A1 | 4/2006 | Wagner |
| 2006/0098899 A1 | 5/2006 | King et al. |
| 2006/0204040 A1 | 9/2006 | Freeman et al. |
| 2006/0210112 A1 | 9/2006 | Cohen et al. |
| 2006/0262421 A1 | 11/2006 | Matsumoto et al. |
| 2006/0273984 A1 | 12/2006 | Wanda et al. |
| 2006/0290950 A1 | 12/2006 | Platt et al. |
| 2007/0014466 A1 | 1/2007 | Baldwin |
| 2007/0042346 A1 | 2/2007 | Weller |
| 2007/0057764 A1 | 3/2007 | Sato et al. |
| 2007/0086621 A1 | 4/2007 | Aggarwal et al. |
| 2007/0130547 A1 | 6/2007 | Boillot |
| 2007/0203904 A1 | 8/2007 | Ren et al. |
| 2007/0206719 A1 | 9/2007 | Suryanarayanan et al. |
| 2007/0230929 A1 | 10/2007 | Niwa et al. |
| 2007/0238956 A1 | 10/2007 | Haras et al. |
| 2008/0002860 A1 | 1/2008 | Super et al. |
| 2008/0013826 A1 | 1/2008 | Hillis et al. |
| 2008/0019576 A1 | 1/2008 | Senftner et al. |
| 2008/0019589 A1 | 1/2008 | Yoon et al. |
| 2008/0030429 A1 | 2/2008 | Hailpern et al. |
| 2008/0031492 A1 | 2/2008 | Lanz |
| 2008/0056752 A1 | 3/2008 | Denton et al. |
| 2008/0064954 A1 | 3/2008 | Adams et al. |
| 2008/0106637 A1 | 5/2008 | Nakao et al. |
| 2008/0106746 A1 | 5/2008 | Shpunt et al. |
| 2008/0110994 A1 | 5/2008 | Knowles et al. |
| 2008/0118091 A1 | 5/2008 | Serfaty et al. |
| 2008/0126937 A1 | 5/2008 | Pachet |
| 2008/0170776 A1 | 7/2008 | Albertson et al. |
| 2008/0187175 A1 | 8/2008 | Kim et al. |
| 2008/0244468 A1 | 10/2008 | Nishihara et al. |
| 2008/0246759 A1 | 10/2008 | Summers |
| 2008/0273764 A1 | 11/2008 | Scholl |
| 2008/0278589 A1 | 11/2008 | Thorn |
| 2008/0291160 A1 | 11/2008 | Rabin |
| 2008/0304740 A1 | 12/2008 | Sun et al. |
| 2008/0317292 A1 | 12/2008 | Baker et al. |
| 2008/0319356 A1 | 12/2008 | Cain et al. |
| 2009/0002489 A1 | 1/2009 | Yang et al. |
| 2009/0038056 A1 | 2/2009 | Bobbin et al. |
| 2009/0093307 A1 | 4/2009 | Miyaki |
| 2009/0102840 A1 | 4/2009 | Li |
| 2009/0103780 A1 | 4/2009 | Nishihara et al. |
| 2009/0116742 A1 | 5/2009 | Nishihara |
| 2009/0122146 A1 | 5/2009 | Zalewski et al. |
| 2009/0153655 A1 | 6/2009 | Ike et al. |
| 2009/0203993 A1 | 8/2009 | Mangat et al. |
| 2009/0203994 A1 | 8/2009 | Mangat et al. |

(56) References Cited

U.S. PATENT DOCUMENTS

| | | |
|---|---|---|
| 2009/0217211 A1 | 8/2009 | Hildreth et al. |
| 2009/0239587 A1 | 9/2009 | Negron et al. |
| 2009/0257623 A1 | 10/2009 | Tang et al. |
| 2009/0274339 A9 | 11/2009 | Cohen et al. |
| 2009/0278915 A1 | 11/2009 | Kramer et al. |
| 2009/0309710 A1 | 12/2009 | Kakinami |
| 2009/0315837 A1 | 12/2009 | Geiger |
| 2009/0323121 A1 | 12/2009 | Valkenburg et al. |
| 2010/0013832 A1 | 1/2010 | Xiao et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0053209 A1 | 3/2010 | Rauch et al. |
| 2010/0053612 A1 | 3/2010 | Ou-Yang et al. |
| 2010/0058252 A1 | 3/2010 | Ko |
| 2010/0066737 A1 | 3/2010 | Liu |
| 2010/0066975 A1 | 3/2010 | Rehnstrom |
| 2010/0091110 A1 | 4/2010 | Hildreth |
| 2010/0118123 A1 | 5/2010 | Freedman et al. |
| 2010/0121189 A1 | 5/2010 | Ma et al. |
| 2010/0125815 A1 | 5/2010 | Wang et al. |
| 2010/0127995 A1 | 5/2010 | Rigazio et al. |
| 2010/0141762 A1 | 6/2010 | Siann et al. |
| 2010/0153457 A1 | 6/2010 | Grant |
| 2010/0158372 A1 | 6/2010 | Kim et al. |
| 2010/0175172 A1 | 7/2010 | Dempsey et al. |
| 2010/0177929 A1 | 7/2010 | Kurtz et al. |
| 2010/0194863 A1 | 8/2010 | Lopes et al. |
| 2010/0199229 A1 | 8/2010 | Kipman et al. |
| 2010/0199230 A1 | 8/2010 | Latta et al. |
| 2010/0199232 A1 | 8/2010 | Mistry et al. |
| 2010/0201880 A1 | 8/2010 | Iwamura |
| 2010/0208942 A1 | 8/2010 | Porter et al. |
| 2010/0219934 A1 | 9/2010 | Matsumoto |
| 2010/0222102 A1 | 9/2010 | Rodriguez |
| 2010/0264833 A1 | 10/2010 | Van Endert et al. |
| 2010/0277411 A1 | 11/2010 | Yee et al. |
| 2010/0296698 A1 | 11/2010 | Lien et al. |
| 2010/0302015 A1 | 12/2010 | Kipman et al. |
| 2010/0302357 A1 | 12/2010 | Hsu et al. |
| 2010/0303298 A1 | 12/2010 | Marks et al. |
| 2010/0306712 A1 | 12/2010 | Snook et al. |
| 2010/0309097 A1 | 12/2010 | Raviv et al. |
| 2011/0007072 A1 | 1/2011 | Khan et al. |
| 2011/0025818 A1 | 2/2011 | Gallmeier et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0080490 A1 | 4/2011 | Clarkson et al. |
| 2011/0090252 A1 | 4/2011 | Yoon et al. |
| 2011/0090407 A1 | 4/2011 | Friedman |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0145981 A1 | 6/2011 | Teetzel et al. |
| 2011/0148875 A1 | 6/2011 | Kim et al. |
| 2011/0169726 A1 | 7/2011 | Holmdahl et al. |
| 2011/0173574 A1 | 7/2011 | Clavin et al. |
| 2011/0176146 A1 | 7/2011 | Alvarez Diez et al. |
| 2011/0181509 A1 | 7/2011 | Rautiainen et al. |
| 2011/0193778 A1 | 8/2011 | Lee et al. |
| 2011/0205151 A1 | 8/2011 | Newton et al. |
| 2011/0213664 A1 | 9/2011 | Osterhout et al. |
| 2011/0221672 A1 | 9/2011 | Osterhout et al. |
| 2011/0228978 A1 | 9/2011 | Chen et al. |
| 2011/0234631 A1 | 9/2011 | Kim et al. |
| 2011/0234840 A1 | 9/2011 | Klefenz et al. |
| 2011/0239354 A1 | 10/2011 | Celona et al. |
| 2011/0243451 A1 | 10/2011 | Oyaizu |
| 2011/0251896 A1 | 10/2011 | Impollonia et al. |
| 2011/0261178 A1 | 10/2011 | Lo et al. |
| 2011/0267259 A1 | 11/2011 | Tidemand et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304600 A1 | 12/2011 | Yoshida |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0030637 A1 | 2/2012 | Dey et al. |
| 2012/0038637 A1 | 2/2012 | Marks |
| 2012/0050143 A1 | 3/2012 | Border et al. |
| 2012/0050157 A1 | 3/2012 | Latta et al. |
| 2012/0062444 A1 | 3/2012 | Cok et al. |
| 2012/0065499 A1 | 3/2012 | Chono |
| 2012/0068914 A1 | 3/2012 | Jacobsen et al. |
| 2012/0079420 A1 | 3/2012 | Arriola |
| 2012/0086624 A1 | 4/2012 | Thompson et al. |
| 2012/0086728 A1 | 4/2012 | Mcardle et al. |
| 2012/0113316 A1 | 5/2012 | Ueta et al. |
| 2012/0132682 A1 | 5/2012 | Mongan et al. |
| 2012/0143361 A1 | 6/2012 | Kurabayashi et al. |
| 2012/0159380 A1 | 6/2012 | Kocienda et al. |
| 2012/0163675 A1 | 6/2012 | Joo et al. |
| 2012/0170800 A1 | 7/2012 | da Silva Frazao et al. |
| 2012/0194420 A1 | 8/2012 | Osterhout et al. |
| 2012/0194517 A1 | 8/2012 | Izadi et al. |
| 2012/0204133 A1 | 8/2012 | Guendelman et al. |
| 2012/0223959 A1 | 9/2012 | Lengeling |
| 2012/0236288 A1 | 9/2012 | Stanley |
| 2012/0250936 A1 | 10/2012 | Holmgren |
| 2012/0257797 A1 | 10/2012 | Leyvand et al. |
| 2012/0270654 A1 | 10/2012 | Padovani et al. |
| 2012/0274781 A1 | 11/2012 | Shet et al. |
| 2012/0281873 A1 | 11/2012 | Brown et al. |
| 2012/0281884 A1 | 11/2012 | Whillock et al. |
| 2012/0293667 A1 | 11/2012 | Baba et al. |
| 2012/0314030 A1 | 12/2012 | Datta et al. |
| 2012/0320080 A1 | 12/2012 | Giese et al. |
| 2013/0002649 A1 | 1/2013 | Wu et al. |
| 2013/0014052 A1 | 1/2013 | Frey et al. |
| 2013/0019204 A1 | 1/2013 | Kotler et al. |
| 2013/0038694 A1 | 2/2013 | Nichani et al. |
| 2013/0044951 A1 | 2/2013 | Cherng et al. |
| 2013/0050425 A1 | 2/2013 | Im et al. |
| 2013/0080898 A1 | 3/2013 | Lavian et al. |
| 2013/0086531 A1 | 4/2013 | Sugita et al. |
| 2013/0097566 A1 | 4/2013 | Berglund |
| 2013/0120319 A1 | 5/2013 | Givon |
| 2013/0127980 A1 | 5/2013 | Haddick et al. |
| 2013/0148852 A1 | 6/2013 | Partis et al. |
| 2013/0156296 A1 | 6/2013 | El Dokor |
| 2013/0182079 A1 | 7/2013 | Holz |
| 2013/0182897 A1 | 7/2013 | Holz |
| 2013/0187952 A1 | 7/2013 | Berkovich et al. |
| 2013/0191911 A1 | 7/2013 | Dellinger et al. |
| 2013/0204457 A1 | 8/2013 | King et al. |
| 2013/0208948 A1 | 8/2013 | Berkovich et al. |
| 2013/0222308 A1 | 8/2013 | Ma et al. |
| 2013/0222640 A1 | 8/2013 | Baek et al. |
| 2013/0239059 A1 | 9/2013 | Chen et al. |
| 2013/0241832 A1 | 9/2013 | Rimon et al. |
| 2013/0249787 A1 | 9/2013 | Morimoto |
| 2013/0252691 A1 | 9/2013 | Alexopoulos |
| 2013/0257736 A1 | 10/2013 | Hou et al. |
| 2013/0258140 A1 | 10/2013 | Lipson et al. |
| 2013/0261871 A1 | 10/2013 | Hobbs et al. |
| 2013/0271370 A1 | 10/2013 | Wang et al. |
| 2013/0271397 A1 | 10/2013 | MacDougall et al. |
| 2013/0278631 A1 | 10/2013 | Border et al. |

(56) References Cited

U.S. PATENT DOCUMENTS

| | | |
|---|---|---|
| 2013/0293688 A1 | 11/2013 | Benson et al. |
| 2013/0293723 A1 | 11/2013 | Benson et al. |
| 2013/0300637 A1 | 11/2013 | Smits et al. |
| 2013/0300831 A1 | 11/2013 | Mavromatis et al. |
| 2013/0307856 A1 | 11/2013 | Keane et al. |
| 2013/0307935 A1 | 11/2013 | Rappel et al. |
| 2013/0321261 A1 | 12/2013 | Nakasu et al. |
| 2013/0321265 A1 | 12/2013 | Bychkov et al. |
| 2013/0328867 A1 | 12/2013 | Jung et al. |
| 2013/0328928 A1 | 12/2013 | Yamagishi et al. |
| 2013/0335301 A1 | 12/2013 | Wong et al. |
| 2013/0335573 A1 | 12/2013 | Forutanpour et al. |
| 2014/0002365 A1 | 1/2014 | Ackley et al. |
| 2014/0010441 A1 | 1/2014 | Shamaie |
| 2014/0023247 A1 | 1/2014 | Kuwahara et al. |
| 2014/0064566 A1 | 3/2014 | Shreve et al. |
| 2014/0081521 A1 | 3/2014 | Frojdh et al. |
| 2014/0085203 A1 | 3/2014 | Kobayashi |
| 2014/0099019 A1 | 4/2014 | El Dokor |
| 2014/0125775 A1 | 5/2014 | Holz |
| 2014/0125813 A1 | 5/2014 | Holz |
| 2014/0132738 A1 | 5/2014 | Ogura et al. |
| 2014/0134733 A1 | 5/2014 | Wu et al. |
| 2014/0139425 A1 | 5/2014 | Sakai |
| 2014/0139641 A1 | 5/2014 | Holz |
| 2014/0152809 A1 | 6/2014 | Jarvis |
| 2014/0157135 A1 | 6/2014 | Lee et al. |
| 2014/0161311 A1 | 6/2014 | Kim |
| 2014/0168062 A1 | 6/2014 | Katz et al. |
| 2014/0176310 A1 | 6/2014 | Kotlicki |
| 2014/0176420 A1 | 6/2014 | Zhou et al. |
| 2014/0177913 A1 | 6/2014 | Holz |
| 2014/0189579 A1 | 7/2014 | Rimon et al. |
| 2014/0189938 A1 | 7/2014 | Redpath et al. |
| 2014/0192024 A1 | 7/2014 | Holz |
| 2014/0195988 A1 | 7/2014 | Kramer et al. |
| 2014/0201666 A1 | 7/2014 | Bedikian et al. |
| 2014/0201689 A1 | 7/2014 | Bedikian et al. |
| 2014/0210793 A1 | 7/2014 | Eriksson et al. |
| 2014/0222385 A1 | 8/2014 | Muenster et al. |
| 2014/0223385 A1 | 8/2014 | Ton et al. |
| 2014/0225826 A1 | 8/2014 | Juni |
| 2014/0225918 A1 | 8/2014 | Mittal et al. |
| 2014/0240215 A1 | 8/2014 | Tremblay et al. |
| 2014/0240225 A1 | 8/2014 | Eilat |
| 2014/0248950 A1 | 9/2014 | Tosas Bautista |
| 2014/0253512 A1 | 9/2014 | Narikawa et al. |
| 2014/0253711 A1 | 9/2014 | Balch et al. |
| 2014/0253785 A1 | 9/2014 | Chan et al. |
| 2014/0267098 A1 | 9/2014 | Na et al. |
| 2014/0282282 A1 | 9/2014 | Holz |
| 2014/0285403 A1 | 9/2014 | Kobayashi |
| 2014/0306874 A1 | 10/2014 | Finocchio et al. |
| 2014/0306891 A1 | 10/2014 | Latta et al. |
| 2014/0307920 A1 | 10/2014 | Holz |
| 2014/0320274 A1 | 10/2014 | De Schepper et al. |
| 2014/0344762 A1 | 11/2014 | Grasset et al. |
| 2014/0361976 A1 | 12/2014 | Osman et al. |
| 2014/0364209 A1 | 12/2014 | Perry |
| 2014/0364212 A1 | 12/2014 | Osman et al. |
| 2014/0369558 A1 | 12/2014 | Holz |
| 2014/0375547 A1 | 12/2014 | Katz et al. |
| 2014/0375947 A1 | 12/2014 | Park et al. |
| 2015/0003673 A1 | 1/2015 | Fletcher |
| 2015/0009149 A1 | 1/2015 | Gharib et al. |
| 2015/0016777 A1 | 1/2015 | Abovitz et al. |
| 2015/0022447 A1 | 1/2015 | Hare et al. |
| 2015/0024368 A1 | 1/2015 | King, Jr. |
| 2015/0029091 A1 | 1/2015 | Nakashima et al. |
| 2015/0040297 A1 | 2/2015 | Vermillion |
| 2015/0054729 A1 | 2/2015 | Minnen et al. |
| 2015/0084864 A1 | 3/2015 | Geiss et al. |
| 2015/0092015 A1 | 4/2015 | Stafford |
| 2015/0094142 A1 | 4/2015 | Stafford |
| 2015/0097772 A1 | 4/2015 | Starner |
| 2015/0115802 A1 | 4/2015 | Kuti et al. |
| 2015/0116214 A1 | 4/2015 | Grunnet-Jepsen et al. |
| 2015/0122855 A1 | 5/2015 | Parsons et al. |
| 2015/0131859 A1 | 5/2015 | Kim et al. |
| 2015/0138070 A1 | 5/2015 | Iwatsu |
| 2015/0172539 A1 | 6/2015 | Neglur |
| 2015/0193669 A1 | 7/2015 | Gu et al. |
| 2015/0205358 A1 | 7/2015 | Lyren |
| 2015/0205400 A1 | 7/2015 | Hwang et al. |
| 2015/0206321 A1 | 7/2015 | Scavezze et al. |
| 2015/0227795 A1 | 8/2015 | Starner et al. |
| 2015/0234569 A1 | 8/2015 | Hess |
| 2015/0253428 A1 | 9/2015 | Holz |
| 2015/0258432 A1 | 9/2015 | Stafford et al. |
| 2015/0261291 A1 | 9/2015 | Mikhailov et al. |
| 2015/0304593 A1 | 10/2015 | Sakai |
| 2015/0317831 A1 | 11/2015 | Ebstyne et al. |
| 2015/0320189 A1 | 11/2015 | Ju et al. |
| 2015/0323785 A1 | 11/2015 | Fukata et al. |
| 2015/0323795 A1 | 11/2015 | Alto et al. |
| 2015/0326762 A1 | 11/2015 | Ju et al. |
| 2015/0351482 A1 | 12/2015 | Gendron et al. |
| 2015/0366284 A1 | 12/2015 | Dowling et al. |
| 2016/0025978 A1 | 1/2016 | Mallinson |
| 2016/0044298 A1 | 2/2016 | Holz et al. |
| 2016/0062573 A1 | 3/2016 | Dascola et al. |
| 2016/0086046 A1 | 3/2016 | Holz et al. |
| 2016/0093105 A1 | 3/2016 | Rimon et al. |

FOREIGN PATENT DOCUMENTS

| | | |
|---|---|---|
| CN | 201332447 Y | 10/2009 |
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102184014 A | 9/2011 |
| CN | 102201121 A | 9/2011 |
| CN | 102236412 A | 11/2011 |
| CN | 102696057 A | 9/2012 |
| CN | 103090862 A | 5/2013 |
| DE | 4201934 A1 | 7/1993 |
| DE | 10326035 A1 | 1/2005 |
| DE | 102007015495 A1 | 10/2007 |
| DE | 102007015497 B4 | 1/2014 |
| EP | 0999542 A1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2480140 A | 11/2011 |
| GB | 2519418 A | 4/2015 |
| JP | H02236407 A | 9/1990 |
| JP | H08261721 A | 10/1996 |
| JP | H09259278 A | 10/1997 |
| JP | 2000023038 A | 1/2000 |
| JP | 2002133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | 2009037594 A | 2/2009 |
| JP | 2010060548 A | 3/2010 |
| JP | 2011010258 A | 1/2011 |
| JP | 2011065652 A | 3/2011 |
| JP | 2011107681 A | 6/2011 |
| JP | 4906960 B2 | 3/2012 |
| JP | 2012527145 A | 11/2012 |
| KR | 101092909 B1 | 12/2011 |
| KR | 20130079841 A | 7/2013 |
| RU | 2422878 C1 | 6/2011 |
| TW | 200844871 A | 11/2008 |
| WO | 9426057 A1 | 11/1994 |
| WO | 2004114220 A1 | 12/2004 |
| WO | 2006020846 A2 | 2/2006 |

(56) References Cited

FOREIGN PATENT DOCUMENTS

| WO | 2006090197 A1 | 8/2006 |
|---|---|---|
| WO | 2007137093 A2 | 11/2007 |
| WO | 20090142797 A2 | 11/2009 |
| WO | 2010007662 A1 | 1/2010 |
| WO | 2010032268 A2 | 3/2010 |
| WO | 2010076622 A1 | 7/2010 |
| WO | 2010088035 A2 | 8/2010 |
| WO | 2010138741 A1 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |
| WO | 2015172118 A1 | 11/2015 |

OTHER PUBLICATIONS

U.S. Appl. No. 15/681,251, filed Aug. 18, 2017, U.S. Pat. No. 10,600,248, Mar. 24, 2020, Issued.
U.S. Appl. No. 16/823,294, filed Mar. 18, 2020, U.S. Pat. No. 11,080,937, Aug. 3, 2021, Issued.
U.S. Appl. No. 17/384,699, filed Jul. 23, 2021, U.S. Pat. No. 11,676,349, Jun. 13, 2023, Issued.
U.S. Appl. No. 14/997,454, filed Jan. 15, 2016, U.S. Pat. No. 10,656,720, May 19, 2020, Issued.
U.S. Appl. No. 16/877,231, filed May 18, 2020, U.S. Pat. No. 11/036,304, Jun. 15, 2021, Issued.
U.S. Appl. No. 17/345,919, filed Jun. 11, 2021, US-2021-0303079-A1, Sep. 30, 2021, Published.
U.S. Appl. No. 14/718,002—Office Action dated Dec. 29, 2016, 10 pages.
U.S. Appl. No. 14/997,454—Office Action dated Dec. 1, 2016, 13 pages.
U.S. Appl. No. 14/718,002—Response to Office Action dated Dec. 29, 2016 filed Mar. 29, 2017, 10 pages.
U.S. Appl. No. 14/718,002—Notice of Allowance dated Apr. 18, 2017, 17 pages.
U.S. Appl. No. 15/681,251—Office Action dated Jan. 14, 2019, 14 pages.
U.S. Appl. No. 15/681,251—Response to Office Action dated Jan. 14, 2019 filed May 14, 2019, 19 pages.
U.S. Appl. No. 15/681,251—Office Action dated Jun. 10, 2019, 13 pages.
U.S. Appl. No. 14/997,454—Response to Office Action dated Dec. 1, 2016 filed on Mar. 30, 2017, 10 pages.
U.S. Appl. No. 14/997,454—Final Office Action dated Jun. 12, 2017, 25 pages.
U.S. Appl. No. 14/997,454—Response to Final Office Action dated Jun. 12, 2017 filed Sep. 12, 2017, 10 pages.
U.S. Appl. No. 14/997,454—Supplemental Response to Final Office Action dated Jun. 12, 2017 filed Oct. 9, 2017, 11 pages.
U.S. Appl. No. 14/997,454—Office Action dated Oct. 20, 2017, 22 pages.
U.S. Appl. No. 14/997,454—Response to Office Action dated Oct. 20, 2017, filed Mar. 22, 2018, 22 pages.
U.S. Appl. No. 14/997,454—Office Action dated May 18, 2018, 18 pages.
U.S. Appl. No. 14/997,454—Response to Office Action dated May 18, 2018, filed Oct. 30, 2018, 14 pages.
U.S. Appl. No. 14/997,454—Office Action dated Mar. 28, 2019, 26 pages.
U.S. Appl. No. 15/681,251—Response to Office Action dated Jun. 10, 2019, filed Sep. 10, 2019, 9 pages.
U.S. Appl. No. 15/681,251—Notice of Allowance dated Nov. 14, 2019, 11 pages.
U.S. Appl. No. 16/823,294—Office Action dated Dec. 8, 2020, 15 pages.
U.S. Appl. No. 16/823,294—Notice of Allowance Apr. 1, 2021, 23 pages.
U.S. Appl. No. 16/823,294—Response to Office Action dated Dec. 8, 2020 filed Mar. 9, 2021, 29 pages.
U.S. Appl. No. 14/997,454—Response to Office Action dated Mar. 28, 2019, filed Jun. 26, 2019, 12 pages.
U.S. Appl. No. 14/997,454—Office Action dated Sep. 12, 2019, 30 pages.
U.S. Appl. No. 14/997,454—Response to Office Action dated Sep. 12, 2019, filed Dec. 12, 2019, 12 pages.
U.S. Appl. No. 14/997,454—Notice of Allowance dated Jan. 14, 2020, 9 pages.
U.S. Appl. No. 16/877,231—Office Action dated Oct. 29, 2020, 16 pages.
U.S. Appl. No. 16/877,231—Response to Office Action dated Oct. 29, 2020, filed 9 pages.
U.S. Appl. No. 16/877,231—Notice of Allowance dated Feb. 10, 2021, 16 pages.
U.S. Appl. No. 17/345,919—Office Action dated Oct. 26, 2022, 32 pages.
"Hessian Matrix of the Image," Matlab—Hessian Matrix of the Image—Stack Overflow, last edited Mar. 13, 2014, retrieved from the internet: <http://stackoverflow.com/questions/22378360/hessian-matrix-of-the-image> on Mar. 10, 2015, 3 pages.
"How Hessian Feature Detector Works?" Signal Processing Stack Exchange, last edited Oct. 2013, retrieved from the internet: <http://dsp.stackexchange.com/questions/10579/how0hessian-feature-detector-works> on Mar. 10, 2015, 3 pages.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Ballan et al., "Lecture Notes Computer Science: 12th European Conference on Computer Vision: Motion Capture of Hands in Action Using Discriminative Salient Points", Oct. 7-13, 2012 [retrieved Jul. 14, 2016], Springer Berlin Heidelberg, vol. 7577, pp. 640-653. Retrieved from the Internet: <http://link.springer.com/chapter/10.1007/978-3-642-33783-3_46>.
Barat et al., "Feature Correspondences From Multiple Views of Coplanar Ellipses", 2nd International Symposium on Visual Computing, Author Manuscript, 2006, 10 pages.
Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.
Bhutami, R., "What are the Ways of Calculating 2x2 Hessian Matrix for 2D Image of Pixel at (x,y) Position?," Quora, last updated May 2013, retrieved from the internet: <http://www.quora.com/What-are-the-ways-of-calculating-2-x-2-hessian-m-atrix-for-2d-image-of-pixel-at-x-y-position> on Mar. 10, 2015, 4 pages.
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Cheikh et al., "Multipeople Tracking Across Multiple Cameras", International Journal on New Computer Architectures and Their Applications (IJNCAA), vol. 2, No. 1, 2012, pp. 23-33.
Choras, M., et al., "Contactless Palmprint and Knuckle Biometrics for Mobile Devices", Springerlink, Dec. 8, 2009, 13 pages.
Chung, et al., "Recovering LSHGCs and SHGCs from Stereo," International Journal of Computer Vision, vol. 20, No. 1/2, Oct. 1996, pp. 43-58.
CN 2013800122765—Office Action dated Nov. 2, 2015, 17 pages.
CN 2013800122765—Response to First Office Action dated Nov. 2, 2015 filed May 14, 2016, 14 pages.
CN 2013800122765—Response to Second Office Action dated Jul. 27, 2016 filed Oct. 11, 2016, 3 pages.
CN 2013800122765—Second Office Action dated Jul. 27, 2016, 6 pages.

(56) References Cited

OTHER PUBLICATIONS

CN 201580041594.3—First Office Action dated Feb. 3, 2019, 29 pages.
Cui et al., "Applications of Evolutionary Computing: Vision-Based Hand Motion Capture Using Genetic Algorithm", 2004 [retrieved Jul. 15, 2016], Springer Berlin Heidelberg, vol. 3005 of LNCS, pp. 289-300. Retrieved from the Internet: <http://link.springer.com/chapter/10.1007/978-3-540-24653-4_30>.
Cumani, A., et al., "Recovering the 3D Structure of Tubular Objects from Stereo Silhouettes," Pattern Recognition, Elsevier, GB, vol. 30, No. 7, Jul. 1, 1997, 9 pages.
Davis et al., "Toward 3-D Gesture Recognition", International Journal of Pattern Recognition and Artificial Intelligence, vol. 13, No. 03, 1999, pp. 381-393.
DE 11 2013 000 590.5—First Office Action dated Nov. 5, 2014, 7 pages.
DE 11 2013 000 590.5—Notice of Allowance dated Jan. 18, 2016, 8 pages.
DE 11 2013 000 590.5—Response to First Office Action dated Nov. 5, 2014 filed Apr. 24, 2015, 1 page.
DE 11 2013 000 590.5—Response to Second Office Action dated Apr. 29, 2015 filed Sep. 16, 2015, 11 pages.
DE 11 2013 000 590.5—Response to Third Office Action dated Sep. 28, 2015 filed Dec. 14, 2015, 64 pages.
DE 11 2013 000 590.5—Second Office Action dated Apr. 29, 2015, 7 pages.
DE 11 2013 000 590.5—Third Office Action dated Sep. 28, 2015, 4 pages.
Delamarre et al., "Finding Pose of Hand in Video Images: A Stereo-based Approach", Apr. 14-16, 1998 [retrieved Jul. 15, 2016], Third IEEE Intern Conf on Auto Face and Gesture Recog, pp. 585-590. Retrieved from the Internet: <http://ieeexplore.ieee.org/xpl/login.jsp?tp=&arnumber=671011&url=http%3A%2F%2Fieeexplore.ieee.org%2Fxpls%2Fabs_all.jsp%3Farnumber%3D671011>.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
Dombeck, D., et al., "Optical Recording of Action Potentials with Second-Harmonic Generation Microscopy," The Journal of Neuroscience, Jan. 28, 2004, vol. 24(4): pp. 999-1003.
Forbes, K., et al., "Using Silhouette Consistency Constraints to Build 3D Models," University of Cape Town, Copyright De Beers 2003, Retrieved from the internet: <http://www.dip.ee.uct.ac.za/~kforbes/Publications/Forbes2003Prasa.pdf> on Jun. 17, 2013, 6 pages.
Franco, Michael. "Wave Your Hand to Control Smart Devices—Even if it's Out of Sight." Cnet (Feb. 28, 2014).
Fukui et al. "Multiple Object Tracking System with Three Level Continuous Processes" IEEE, 1992, pp. 19-27.
Genovese, Angelo, Contactless and less Constrained Palmprint Recognition, Mar. 18, 2014, 48 pages.
De La Gorce et al., "Model-Based 3D Hand Pose Estimation from Monocular Video", Feb. 24, 2011 [retrieved Jul. 15, 2016], IEEE Transac Pattern Analysis and Machine Intell, vol. 33, Issue: 9, pp. 1793-1805, Retri Internet: <http://ieeexplore. ieee.org/xpl/login.jsp?tp=&arnumber=5719617&url=http%3A%2F%2Fieeexplore.ieee.org%2Fxpls% 2 Fabs all.jsp%3Farnumber%3D5719617>.
Grauman, K., et al., "Chapter 3—Local Features: Detection and Description," Visual Object Recognition: Synthesis Lectures on Artificial Intelligence and Machine Learning, Apr. 2011, retrieved from the internet :<www.morganclaypool.com/doi/abs/10.2200/S00332Ed1V01Y201103A- M011> on Mar. 12, 2015, pp. 1, 23-39.
Guo et al., Featured Wand for 3D Interaction, Jul. 2-5, 2007 [retrieved Jul. 15, 2016], 2007 IEEE International Conference on Multimedia and Expo, pp. 2230-2233. Retrieved from the Internet: <http://ieeexplore.ieee.org/xpl/login.jsp?tp=&arnumber=4285129&tag=1&url=http%3A%2F%2Fieeexplore.ieee.org%2Fxpls%2Fabs_all.jsp%3Farnumber%3D4285129%26tag%3D1>.

Heikkila, J., "Accurate Camera Calibration and Feature Based 3-D Reconstruction from Monocular Image Sequences", Infotech Oulu and Department of Electrical Engineering, University of Oulu, 1997, 126 pages.
Hladuvka, J., et al., "Exploiting Eigenvalues of the Hessian Matrix for Volume Decimation," CiteSeerx, Copyright 2001, retrieved from the internet: <http://citeseerx.isf.psu.edu/viewdoc/summary?doi=10.1.1.67.-565> on Mar. 12, 2015, fromVienna University of Technology, 7 pages.
Interactive Gaming Smart Vending Machine. Silikron Smart Vending, URL: https:////www.youtube.com/watch?v=tK17sXvzLtU, Dec. 12, 2013.
Jin et al., Vascular Tree Segmentation in Medical Images Using Hessian-Based Multiscale Filtering and Level Set Method, Hindawi, dated Jun. 28, 2013, 8 pages.
JP 2014-552391—First Office Action dated Dec. 9, 2014, 6 pages.
JP 2014-552391—Response to First Office Action dated Dec. 9, 2014 filed Jun. 8, 2016, 9 pages.
JP 2014-552391—Response to Second Office Action dated Jul. 7, 2015 filed Dec. 25, 2015, 4 pages.
JP 2014-552391—Second Office Action dated Jul. 7, 2015, 7 pages.
JP 2014-552391—Third Office Action dated Jan. 26, 2016, 5 pages.
Kanhangad, V., et al., "Combining 2D and 3D Hand Geometry Features for Biometric Verification", IEEE 2009, 6 pages.
Kanhangad, V., et al., "A Unified Framework for Contactless Hand Verification," IEEE Transactions on Information Forensics and Security, IEEE, Piscataway, NJ, US , vol. 6, No. 3, Sep. 1, 2011, pp. 1014-1027.
Kellogg, Bryce, Vamsi Talia, and Shyamnath Gollakota. "Bringing Gesture Recognition to All Devices," NSDI'14: Proceedings of the 11th USENIX Conference on Networked Systems Design and Implementation, (Apr. 2, 2014), pp. 303-316. (Year: 2014).
Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.
Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.
Matsuyama et al. "Real-Time Dynamic 3-D Object Shape Reconstruction and High-Fidelity Texture Mapping for 3-D Video," IEEE Transactions on Circuits and Systems for Video Technology, vol. 14, No. 3, Mar. 2004, pp. 357-369.
May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.
Melax et al., "Dynamics Based 3D Skeletal Hand Tracking", May 29, 2013 [retrieved Jul. 14, 2016], Proceedings of Graphics Interface, 2013, pp. 63-70. Retrived from the Internet: <http://dl.acm.org/citation.cfm?id=2532141>.
Mendez, et al., "Importance Masks for Revealing Occluded Objects in Augmented Reality," Proceedings of the 16th ACM Symposium on Virtual Reality Software and Technology, 2 pages, ACM, 2009.
Oka et al., "Real-Time Fingertip Tracking and Gesture Recognition", Nov./Dec. 2002 [retrieved Jul. 15, 2016], IEEE Computer Graphics and Applications, vol. 22, Issue: 6, pp. 64-71. Retrieved from the Internet: <http://ieeexplore.ieee.org/xpl/login.jsp?tp=&arnumber=1046630&url=http%3A%2F%2Fieeexplore.ieee.org%2Fxpls%2Fabsall.jsp%3Farnumber%3D1046630>.
Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.
PCT/JP2008/062732, WO English Abstract with Japanese Publication of WO 2010/007662 A1, "Heat-Resistant Cushion material for Forming Press," Jan. 21, 2010, Ichikawa Co Ltd, 35 pages.
PCT/US2013/021709—International Preliminary Report on Patentability dated Jul. 22, 2014, 22 pages.
PCT/US2013/021709—International Search Report and Written Opinion dated Sep. 12, 2013, 22 pages.

(56) References Cited

OTHER PUBLICATIONS

PCT/US2013/021709, International Preliminary Report on Patentability and Written Opinion, Sep. 12, 2013, 22 pages (WO 2013/109608).
PCT/US2013/021713—International Preliminary Report on Patentability dated Jul. 22, 2014, 13 pages, (WO 2013/109609).
PCT/US2013/021713—International Search Report and Written Opinion dated Sep. 11, 2013, 7 pages.
PCT/US2013/069231—International Preliminary Report with Written Opinion dated May 12, 2015, 8 pages.
PCT/US2013/069231—International Search Report and Written Opinion mailed Mar. 13, 2014, 7 pages.
PCT/US2014/013012—International Search Report and Written Opinion dated May 14, 2014, published as WO 2014116991, 12 pages.
PCT/US2014/028265, International Search Report and Written Opinion, Jan. 7, 2015, 15 pages.
PCT/US2015/032705—International Preliminary Report on Patentability dated Nov. 29, 2016, 11 pages.
PCT/US2015/032705—International Search Report dated Sep. 15, 2015, 3 page.
PCT/US2015/032705—Written Opinion of the ISA, mailed Sep. 15, 2015, 10 pages.
Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.
Pointgrab Ltd. "New Line of Acer All-in-One Devices Among the First Products to Feature PointGrab's Windows 8 Hand Gesture Control Solution," Business Wire (English), (Nov. 13, 2012).
Rasmussen, Matihew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.
Rudzki, M., "Vessel Detection Method Based on Eigenvalues of Hessian Matrix and its Applicability to Airway Tree Segmentation," XI International PhD Workshop, OWD 2009, Silesian University of Technology, Oct. 17-20, 2009, 6 pages.
Schaar, R., VCNL4020 Vishay Semiconductors. Application Note [online]. Extended Detection Range with VCNL Family of Proximity Sensor Vishay Intertechnology, Inc, Doc No. 84225, Revised Oct. 25, 2013 [retrieved Mar. 4, 2014]. Retrieved from the Internet: <www.vishay.com>. 4 pages.
Schlattmann et al., "Markerless 4 gestures 6 DOF real-time visual tracking of the human hand with automatic initialization", 2007 [retrieved Jul. 15, 2016], Eurographics 2007, vol. 26, No. 3, 10 pages, Retrieved from the Internet: <http://cg.cs.uni-bonn.de/aigaion2root/attachments/schlattmann-2007-markerless.pdf>.
Shinodalab, "Visuo-Tactile Projector," YouTube Video, published on May 14, 2013, retrieved from the internet: <http://www.youtube.com/watch?v=Bb0hNMxxewg> on Mar. 12, 2015, 2 pages.
Shlens, J., "A Tutorial on Principal Component Analysis," Derivation, Discussion and Singular Value Decomposition, Version 1, Mar. 25, 2013, UCSD.edu, pp. 1-16.
Solanki, Utpal V. and Nilesh H. Desai. "Hand Gesture Based Remote Control for Home Appliances: Handmote," 2011 World Congress on Information and Communication Technologies, Mumbai, (2011), p. 419-423.
Texas Instruments, "4-Channel, 12-Bit, 80-MSPS ADC," VSP5324, Revised Nov. 2012, Texas Instruments Incorporated, 55 pages.
Texas Instruments, "QVGA 3D Time-of-Flight Sensor," Product Overview: OPT 8140, Dec. 2013, Texas Instruments Incorporated, 10 pages.
Texas Instruments, "Time-of-Flight Controller (TFC)," Product Overview; OPT9220, Jan. 2014, Texas Instruments Incorporated, 43 pages.
VCNL4020 Vishay Semiconductors. Datasheet [online]. Vishay Intertechnology, Inc, Doc No. 83476, Rev. 1.3, Oct. 29, 2013 [retrieved Mar. 4, 2014]. Retrieved from the Internet: <www.vishay.com>. 16 pages.
Wang et al., "Tracking of Deformable Hand in Real Time as Continuous Input for Gesture-based Interaction", Jan. 28, 2007 [retrieved Jul. 15, 2016], Proceedings of the 12th International Conference on Intelligent User Interfaces, pp. 235-242. Retrieved fromthe Internet: <http://dl.acm.org/citation.cfm?id=1216338>.
Wikipedia, "Affine Transmation," Wikipedia—the Free Encyclopedia, last modified Mar. 5, 2015, retrieved from the internet: <http://en.wikipedia.org/w/index.php?title=Affine.sub.--transformation-&oldid=650023248> on Mar. 12, 2015, 8 pages.
Wikipedia, "Axis-angle Representation," Wikipedia—the Free Encyclopedia, last modified Dec. 30, 2014, retrieved from the internet: <http://en.wikipedia.org/w/index.php?title=Axis-angle_representation&oldid=640273193> on Mar. 12, 2015, 5 pages.
Wikipedia, "Euclidean Group," Wikipedia—the Free Encyclopedia, last modified Feb. 24, 2015, retrieved from the internet: <http://en.wikipedia.org/w/index.php?title=Euclidean_group&oldid=648705193> on Mar. 12, 2015, 7 pages.
Wikipedia, "Multilateration," Wikipedia—the Free Encyclopedia, Nov. 16, 2012, retrieved from the internet: <http://en.wikipedia.org/w/index.php?title=Multilateration&oldid=523281858> on Mar. 12, 2015, 10 pages.
Wikipedia, "Rotation Group SO(3)," Wikipedia—the Free Encyclopedia, last modified Feb. 20, 2015, retrieved from the internet: <http://en.wikipedia.org/w/index.php?title=Rotation_group_SO(3)&oldid=648012313> on Mar. 13, 2015, 17 pages.
Wikipedia, "Rotation Matrix," Wikipedia—the Free Encyclopedia, last modified Mar. 11, 2015, retrieved from the internet: <http://en.wikipedia.org/w/index.php?title=Rotation.sub.--matrix&oldid- = 650875954> on Mar. 12, 2015, 21 pages.
Wikipedia, "Transformation Matrix," Wikipedia—the Free Encyclopedia, last modified Mar. 5, 2015, retrieved from the internet: <http://en.wikipedia.org/w/index.php?title=Transformation.sub.--matrix- &oldid=649936175> on Mar. 12, 2015, 8 pages.
Wong, Kie Yih Edward, et al., "Palmprint Identification Using Sobel Operator," 10th International Conference on Control, automation, Robotics and Vision, Dec. 17-20, 2008, 4 pages.
Zhao et al., "Combining Marker-Based Mocap and RGB-D Camera for Acquiring High-Fidelity Hand Motion Data", Jul. 29, 2012 [retrieved Jul. 15, 2016], Proceedings of the ACM Siggraph/Eurographics Symposium on Computer Animation, pp. 33-42, Retrieved from the Internet: <http://dl.acm.org/citation.cfm?id=2422363>.
Berman et al., "Sensors for Gesture Recognition Systems," IEEE Transactions on Systems, Man, and Cybernetics, Part C (Applications and Reviews), vol. 42, No. 3, May 2012, pp. 277-290.
PCT/US2015/030040—International Search Report dated Aug. 13, 2015, 3 pages.
PCT/US2015/030040—Written Opinion of the International Searching Authority dated Aug. 13, 2015, 7 pages.
CN 2014204535364—Office Action dated Nov. 5, 2014, 1 page.
CN 2014204535364—Response to Nov. 5 Office Action filed Feb. 26, 2015, 8 pages.
CN 2014204535364—Notice of Allowance dated Apr. 17, 2015, 3 pages.
Rolland, et al., "A comparison of optical and video see-through head-mounted displays," 1994, 15 pages.

* cited by examiner

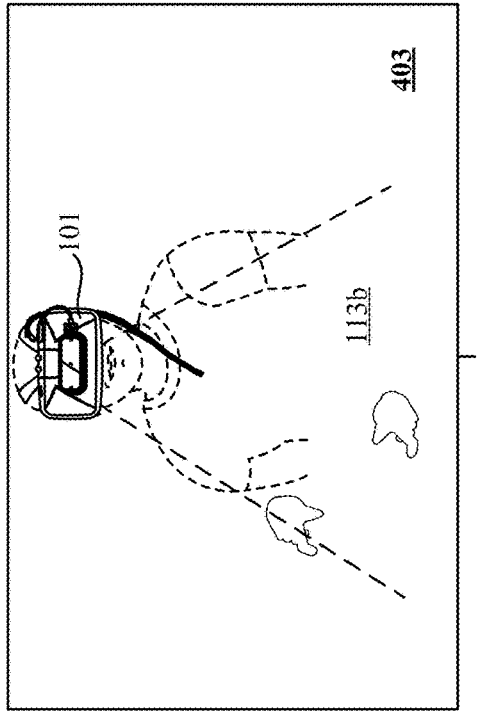
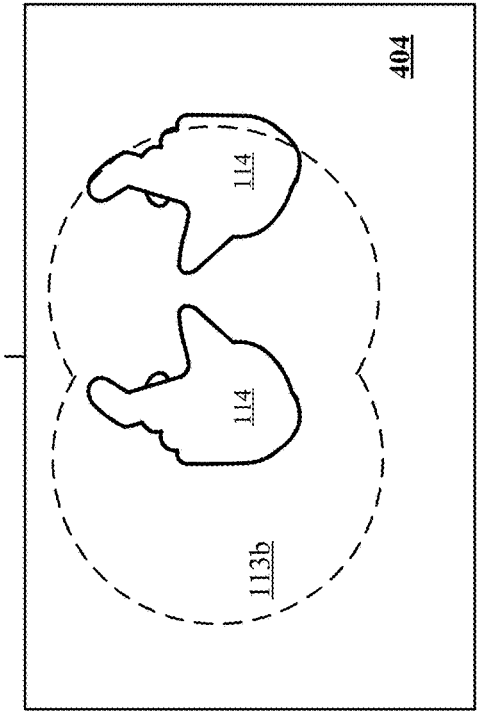
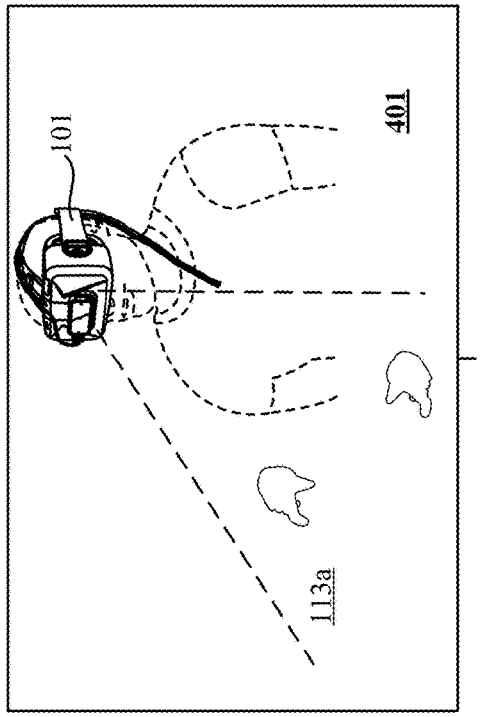
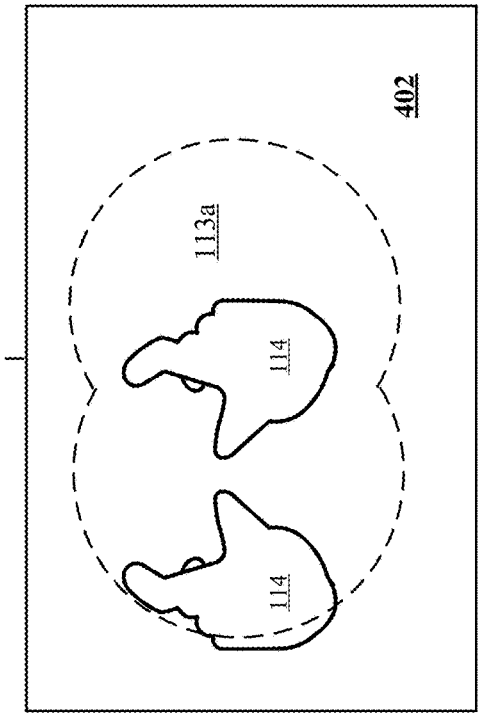
FIG. 4

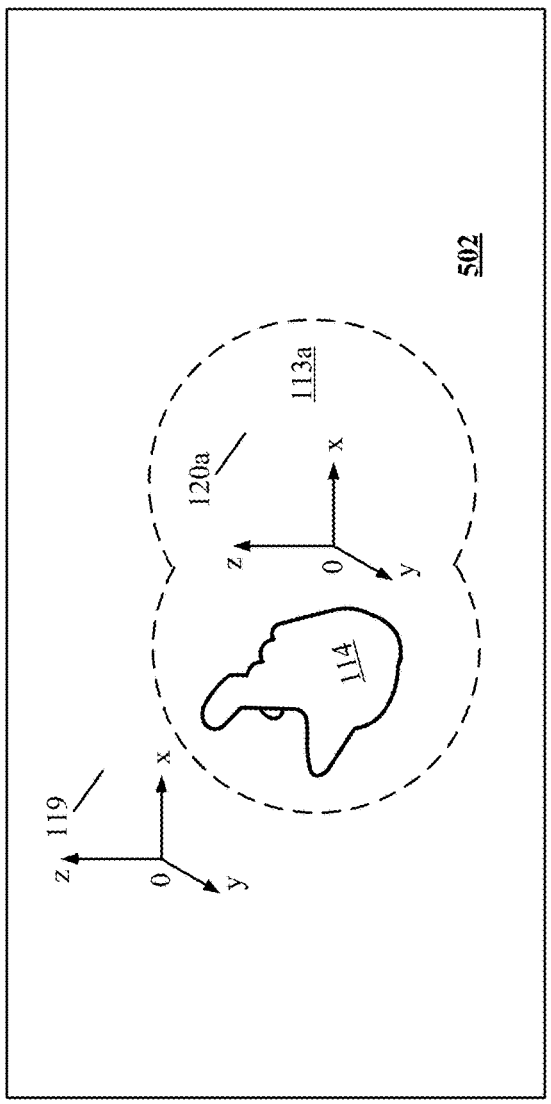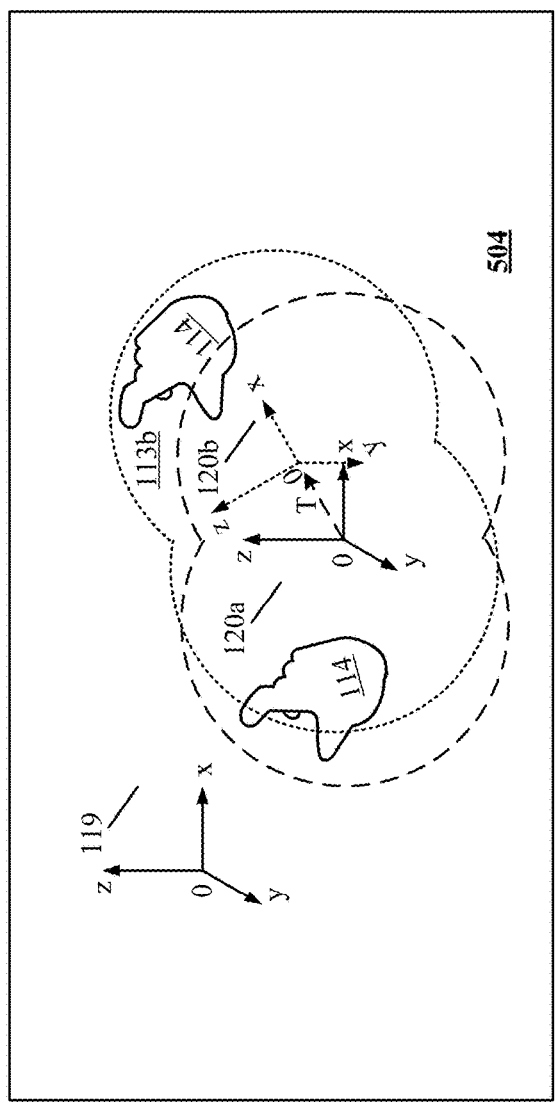
FIG. 5

1400

1410 — using at least one camera to capture a sequence of images of a physical real environment in convergence with an immersive virtual environment 1420 — automatically interrupting the immersive virtual environment and substituting a live feed of the physical real environment 1430 — simultaneously manipulating a virtual object and a physical object during the augmented hybrid experience

1510 — using at least one camera to capture a sequence of images of a physical real environment in convergence with an immersive virtual environment 1520 — automatically interrupting the immersive virtual environment and superimposing at least one virtual object in the physical real environment to generate data representing a mixed reality environment 1530 — simultaneously manipulating a virtual object and a physical object during the augmented hybrid experience

*FIG. 15*

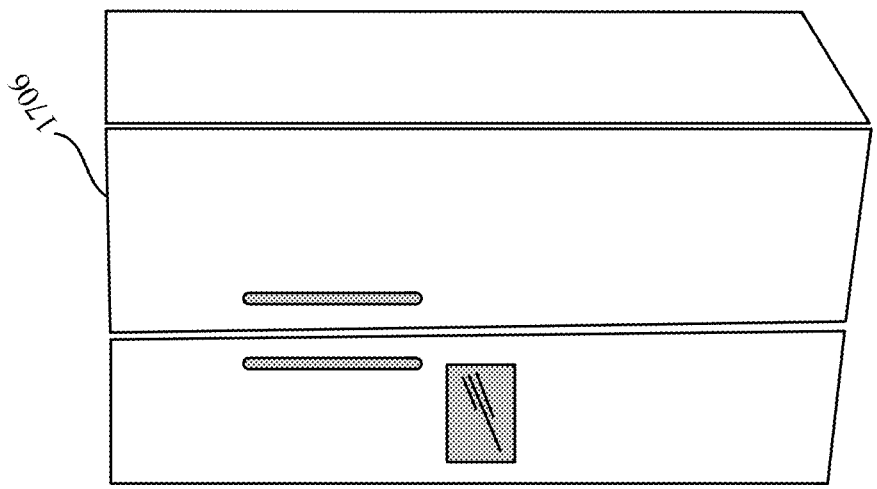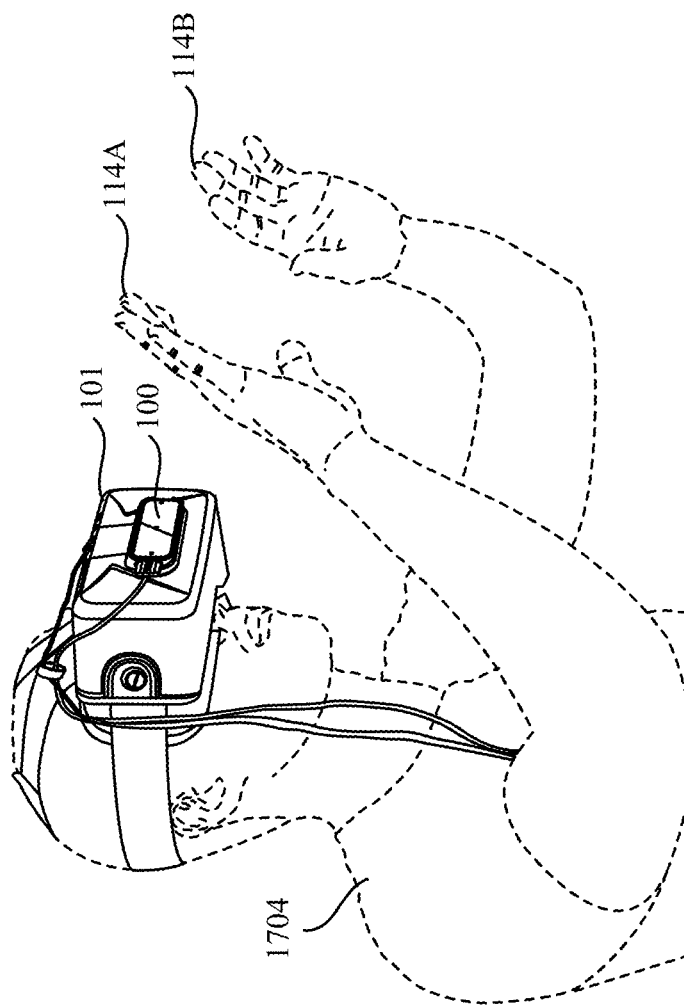
FIG. 17

WEARABLE AUGMENTED REALITY DEVICES WITH OBJECT DETECTION AND TRACKING

This application is a continuation of U.S. patent application Ser. No. 17/384,699, entitled "WEARABLE AUGMENTED REALITY DEVICES WITH OBJECT DETECTION AND TRACKING", filed Jul. 23, 2021, which is a continuation of U.S. patent application Ser. No. 16/823,294, entitled, "WEARABLE AUGMENTED REALITY DEVICES WITH OBJECT DETECTION AND TRACKING", filed Mar. 18, 2020, which is a continuation of U.S. patent application Ser. No. 15/681,251, entitled, "WEARABLE AUGMENTED REALITY DEVICES WITH OBJECT DETECTION AND TRACKING", filed Aug. 18, 2017, which is a continuation of U.S. patent application Ser. No. 14/718,002, entitled, "WEARABLE AUGMENTED REALITY DEVICES WITH OBJECT DETECTION AND TRACKING", filed May 20, 2015, which claims the benefit of U.S. Provisional Patent Application No. 62/001,044, entitled, "WEARABLE AUGMENTED REALITY DEVICES WITH OBJECT DETECTION AND TRACKING," filed on May 20, 2014. The non-provisional and provisional applications are hereby incorporated by reference for all purposes.

FIELD OF THE TECHNOLOGY DISCLOSED

The present disclosure relates generally to human machine interface and in particular to augmented reality for wearable devices and methods of object detection and tracking.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Conventional motion capture approaches rely on markers or sensors worn by the subject while executing activities and/or on the strategic placement of numerous bulky and/or complex equipment in specialized and rigid environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for providing the ability to view and/or interact with the real world when using virtual reality capable devices (e.g., wearable or otherwise having greater portability) by capturing the motion of objects in real time without fixed or difficult to configure sensors or markers.

INTRODUCTION

Implementations of the technology disclosed address these and other problems by providing methods and systems of providing capabilities to view and/or interact with the real world to the user of a wearable (or portable) virtual reality capable device using a sensor configured to capture motion and/or determining the path of an object based on imaging, acoustic or vibrational waves. Implementations can enable improved user experience, greater safety, greater functionality to users of virtual reality for machine control and/or machine communications applications using wearable (or portable) devices, e.g., head mounted devices (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection.

In one implementation, a wearable sensor system includes capabilities to provide presentation output to a user of a virtual reality device. For example, a video stream including a sequence of images of a scene in the real world is captured using one or more cameras on a head mounted device (HMD) having a set of RGB pixels and a set of IR pixels. Information from the IR sensitive pixels is separated out for processing to recognize gestures. Information from the RGB sensitive pixels is provided to a presentation interface of the wearable device as a live video feed to a presentation output. The presentation output is displayed to a user of the wearable sensor system. One or more virtual objects can be integrated with the video stream images to form the presentation output. Accordingly, the device is enabled to provide at least one or all or an combination of the following:
1. gesture recognition,
2. a real world presentation of real world objects via pass through video feed, and/or
3. an augmented reality including virtual objects integrated with a real world view.

In one implementation, a method is described of smoothly transitioning between an immersive virtual environment and a convergent physical real environment during an augmented hybrid experience. The method comprises using at least one camera to capture a sequence of images of a physical real environment in convergence with an immersive virtual environment during an augmented hybrid experience. It also includes automatically interrupting the immersive virtual environment and substituting a live feed (video and/or audio information) of the physical real environment in the augmented hybrid experience in response to a command input.

Convergence between a real environment and an immersive virtual environment can be for example temporal, spatial, or temporal and spatial. For example, a spatial convergence can include display of real and virtual objects related to the space in which the viewer is casting their gaze, such as a virtual "application" and a real cola can made available for interaction with an otherwise real desk within the field of view of the viewer. Temporal convergence can include display of something going on in another space (e.g., behind the viewer, or in another room) at the same time using a window or panel (e.g., a virtual rear view mirror) embedded within the visual field of view of the viewer." An example of a convergence that is spatial but not temporal would be a ghost story application that plays scenes from a haunted house's past depending upon the room that the viewer is in. Other examples consistent with these and other forms of convergence are also contemplated in other implementations.

In one implementation, the command input is automatically triggered in response to a free-form gesture. In another implementation, the command input is automatically triggered in response to an audio signal. In yet another implementation, the command input is automatically triggered in response to a vibrational signal. In a further implementation, the command input is automatically triggered in response to an optical signal.

The method further includes simultaneously, manipulating in responsive a command input at least one virtual object of the immersive virtual environment and at least one physical object of the physical real environment during the augmented hybrid experience.

In some implementations, the method includes the camera being mounted on a head mounted device (HMD), which provides the augmented hybrid experience.

The method includes, at a first time t0, using a sensor attached to the HMD, sensing a first position of at least one physical object in a first reference frame of the physical real environment, including tracking portions of the physical object. It also includes causing display of a first virtual representation of the physical object at the first position, wherein the first virtual representation is rendered in the immersive virtual environment of the HMD. The method further includes, at a second time t1, sensing, in the physical real environment, a second position of the physical object and at least some of the portions different from the first position responsive to repositioning of the physical real environment and the attached sensor due to body movement of a user wearing the HMD, wherein the physical object has not moved in the physical real environment between t0 and t1. It also includes causing display of a second virtual representation of the physical object at an actual second position.

In some implementations, causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame, wherein the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, transforming the first and second positions of the physical object into the common reference frame further includes applying an affine transformation.

In other implementations, the method further includes determining the orientation of the physical object at the first position with respect to the first reference frame and causing the display of the physical object accordingly.

In yet other implementations, the method also includes determining the orientation of the physical object at the second position with respect to the second reference frame and causing the display of the physical object accordingly.

In yet another implementation, a method is described of smoothly transitioning between an immersive virtual environment and a convergent mixed reality environment during an augmented hybrid experience. The mixed reality environment includes at least one virtual object of the immersive virtual environment and at least one physical object of the physical real environment.

The method comprises using at least one camera to capture a sequence of images of a physical real environment in convergence with an immersive virtual environment during an augmented hybrid experience. It also includes, responsive to a command input, automatically, interrupting the immersive virtual environment and superimposing at least one virtual object of the immersive virtual environment in the physical real environment to generate data representing a mixed reality environment during the augmented hybrid experience.

In one implementation, the command input is automatically triggered in response to a free-form gesture. In another implementation, the command input is automatically triggered in response to an audio signal. In yet another implementation, the command input is automatically triggered in response to a vibrational signal. In a further implementation, the command input is automatically triggered in response to an optical signal.

The method further includes simultaneously, manipulating in responsive a command input at least one virtual object of the immersive virtual environment and at least one physical object of the physical real environment during the augmented hybrid experience.

In some implementations, the method includes the camera being mounted on a head mounted device (HMD), which provides the augmented hybrid experience.

The method includes, at a first time t0, using a sensor attached to the HMD, sensing a first position of at least one physical object in a first reference frame of the physical real environment, including tracking portions of the physical object. It also includes causing display of a first virtual representation of the physical object at the first position, wherein the first virtual representation is rendered in the immersive virtual environment of the HMD. The method further includes, at a second time t1, sensing, in the physical real environment, a second position of the physical object and at least some of the portions different from the first position responsive to repositioning of the physical real environment and the attached sensor due to body movement of a user wearing the HMD, wherein the physical object has not moved in the physical real environment between t0 and t1. It also includes causing display of a second virtual representation of the physical object at an actual second position.

In some implementations, causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame, wherein the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, transforming the first and second positions of the physical object into the common reference frame further includes applying an affine transformation.

In other implementations, the method further includes determining the orientation of the physical object at the first position with respect to the first reference frame and causing the display of the physical object accordingly.

In yet other implementations, the method also includes determining the orientation of the physical object at the second position with respect to the second reference frame and causing the display of the physical object accordingly.

In yet further implementation, a method is described of smoothly transitioning between an immersive virtual environment and a convergent physical real environment during an augmented hybrid experience generated by a head mounted device (HMD). The method comprises using at least one camera mounted to a head mounted device (HMD) to capture a sequence of images of a physical real environment in convergence with an immersive virtual environment during an augmented hybrid experience generated by the HMD. It also includes automatically triggering a pass through mode of the HMD in response to a command input, wherein the pass through mode interrupts the immersive virtual environment and substitutes a live feed (video and/or audio information) of the physical real environment in the augmented hybrid experience.

The method includes, at a first time t0, using a sensor attached to the HMD, sensing a first position of at least one physical object in a first reference frame of the physical real environment, including tracking portions of the physical object. It also includes causing display of a first virtual representation of the physical object at the first position, wherein the first virtual representation is rendered in the immersive virtual environment of the HMD. The method further includes, at a second time t1, sensing, in the physical real environment, a second position of the physical object and at least some of the portions different from the first position responsive to repositioning of the physical real environment and the attached sensor due to body movement of a user wearing the HMD, wherein the physical object has not moved in the physical real environment between t0 and t1. It also includes causing display of a second virtual representation of the physical object at an actual second position.

In some implementations, causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame, wherein the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, transforming the first and second positions of the physical object into the common reference frame further includes applying an affine transformation.

In other implementation, the method further includes determining the orientation of the physical object at the first position with respect to the first reference frame and causing the display of the physical object accordingly.

In yet other implementations, the method also includes determining the orientation of the physical object at the second position with respect to the second reference frame and causing the display of the physical object accordingly.

In one implementation, a wearable sensor system includes capabilities to provide presentation output to a user. For example, in one implementation, the device captures a video stream including a sequence of images of a scene in the real world. The video stream images are integrated with virtual object(s) to form a presentation output. The presentation output is displayed to a user of the wearable sensor system. For example, video can be captured with one or more cameras on a head mounted device (HMD) having a set of RGB pixels and a set of IR pixels.

In one implementation, the ambient lighting conditions are determined and can be used to adjust display of output. For example, information from the set of RGB pixels is displayed in normal lighting conditions and information from the set of IR pixels in dark lighting conditions. Alternatively, or additionally, information from the set of IR pixels can be used to enhance the information from the set of RGB pixels for low-light conditions, or vice versa. Some implementations can receive from a user a selection indicating a preferred display chosen from one of color imagery from the RGB pixels and IR imagery from the IR pixels, or combinations thereof. Alternatively, or additionally, the device itself may dynamically switch between video information captured using RGB sensitive pixels and video information captured using IR sensitive pixels for display depending upon ambient conditions, user preferences, situational awareness, other factors, or combinations thereof.

In one implementation, information from the IR sensitive pixels is separated out for processing to recognize gestures; while the information from the RGB sensitive pixels is provided to an output as a live video feed; thereby enabling conserving bandwidth to the gesture recognition processing. In gesture processing, features in the images corresponding to objects in the real world can be detected. The features of the objects are correlated across multiple images to determine change, which can be correlated to gesture motions. The gesture motions can be used to determine command information to a machine under control, application resident thereon or combinations thereof.

In one implementation, motion sensors and/or other types of sensors are coupled to a motion-capture system to monitor motion of at least the sensor of the motion-capture system resulting from, for example, users' touch. Information from the motion sensors can be used to determine first and second positional information of the sensor with respect to a fixed point at first and second times. Difference information between the first and second positional information is determined. Movement information for the sensor with respect to the fixed point is computed based upon the difference information. The movement information for the sensor is applied to apparent environment information sensed by the sensor to remove motion of the sensor therefrom to yield actual environment information; which can be communicated. Control information can be communicated to a system configured to provide a virtual reality or augmented reality experience via a portable device and/or to systems controlling machinery or the like based upon motion capture information for an object moving in space derived from the sensor and adjusted to remove motion of the sensor itself. In some applications, a virtual device experience can be augmented by the addition of haptic, audio and/or visual projectors.

In an implementation, apparent environmental information is captured from positional information of an object portion at the first time and the second time using a sensor of the motion-capture system. Object portion movement information relative to the fixed point at the first time and the second time is computed based upon the difference information and the movement information for the sensor.

In further implementations, a path of the object is calculated by repeatedly determining movement information for the sensor, using the motion sensors, and the object portion, using the sensor, at successive times and analyzing a sequence of movement information to determine a path of the object portion with respect to the fixed point. Paths can be compared to templates to identify trajectories. Trajectories of body parts can be identified as gestures. Gestures can indicate command information to be communicated to a system. Some gestures communicate commands to change operational modes of a system (e.g., zoom in, zoom out, pan, show more detail, next display page, and so forth).

Advantageously, some implementations can enable improved user experience, greater safety and improved functionality for users of virtual reality wearable devices. Some implementations further provide gesture capability allowing the user to execute intuitive gestures involving virtualized contact with a virtual object. For example, a device can be provided a capability to distinguish motion of objects from motions of the device itself in order to facilitate proper gesture recognition. Some implementations can provide improved interfacing with a variety of portable or wearable machines (e.g., smart telephones, portable computing systems, including laptop, tablet computing devices, personal data assistants, special purpose visualization computing machinery, including heads up displays (HUDs) for use in aircraft or automobiles for example, wearable virtual and/or augmented reality systems, including Google Glass, and others, graphics processors, embedded microcontrollers, gaming consoles, or the like; wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human—machine interface experience can be provided.

Other aspects and advantages of the present technology can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the disclosed technology. In the following description, various implementations of the technology disclosed are described with reference to the following drawings, in which:

FIG. 4 illustrates apparent movement of objects from the perspective of the user of a virtual environment enabled apparatus in accordance with the technology disclosed.

FIG. 5 illustrates apparent movement of objects from the perspective of the user of a virtual environment enabled apparatus in accordance with the technology disclosed.

FIG. 14 depicts a representative method of smoothly transitioning between an immersive virtual environment and a convergent physical real environment during an augmented hybrid experience.

FIG. 15 shows a flowchart of one implementation of smoothly transitioning between an immersive virtual environment and a convergent physical real environment during an augmented hybrid experience.

FIG. 17 illustrates one implementation of an augmented hybrid experience in which a user interacts with an immersive virtual environment that takes command inputs performed in a physical real environment.

DETAILED DESCRIPTION

Figure 1:
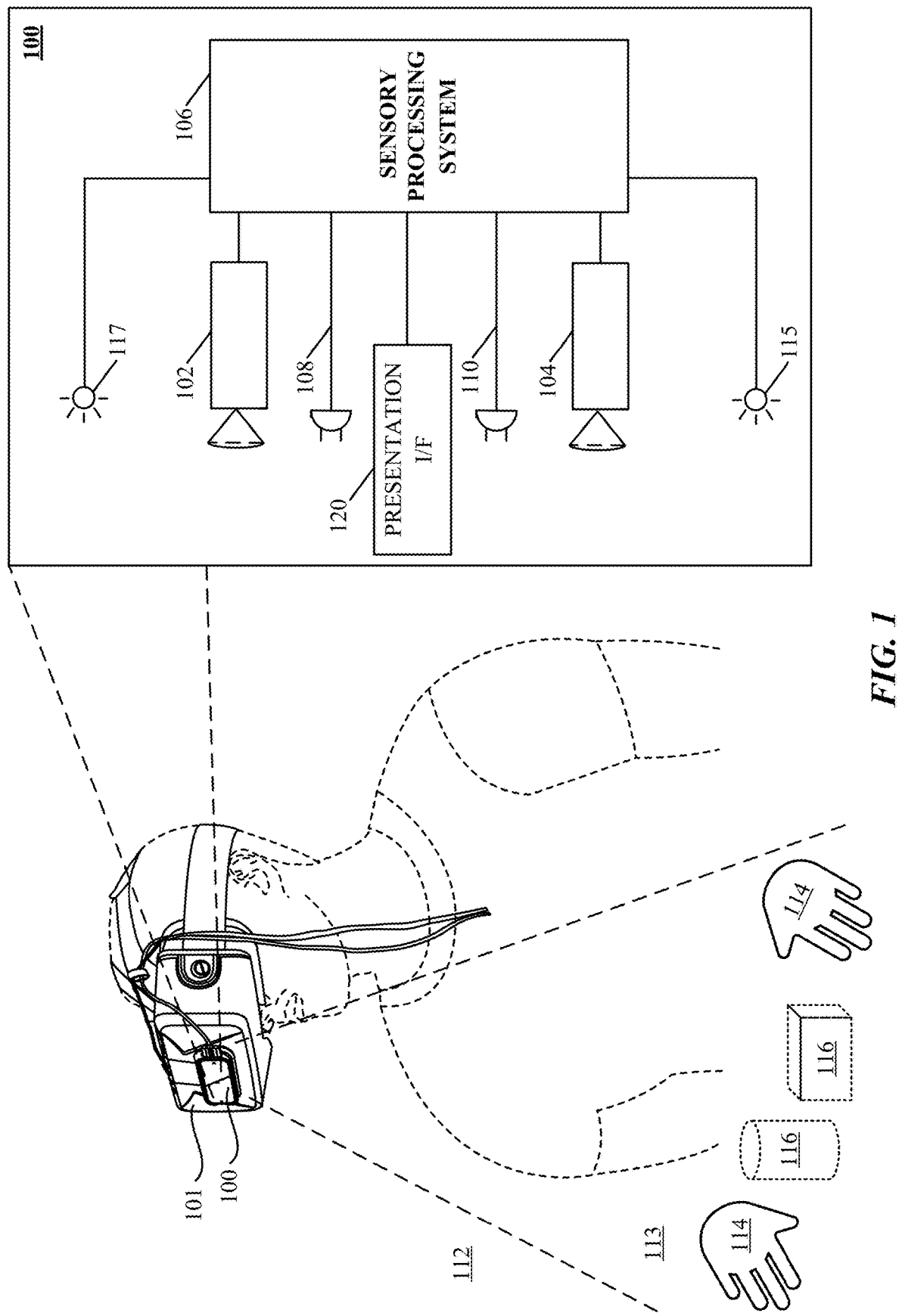
FIG. 1 illustrates a system for capturing image and other sensory data according to an implementation of the technology disclosed.

Among other aspects, the technology described herein with reference to example implementations can provide capabilities to view and/or interact with the real world to the user of a wearable (or portable) device using a sensor or sensors configured to capture motion and/or determining the path of an object based on imaging, acoustic or vibrational waves. Implementations can enable improved user experience, greater safety, greater functionality to users of virtual reality for machine control and/or machine communications applications using wearable (or portable) devices, e.g., head mounted devices (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection. In some implementations, projection techniques can supplement the sensory based tracking with presentation of virtual (or virtualized real) objects (visual, audio, haptic, and so forth) created by applications loadable to, or in cooperative implementation with, the HMD or other device to provide a user of the device with a personal virtual experience (e.g., a functional equivalent to a real experience).

Implementations include providing a "pass-through" in which live video is provided to the user of the virtual reality device, either alone or in conjunction with display of one or more virtual objects, enabling the user to perceive the real world directly. Accordingly, the user is enabled to see an actual desk environment as well as virtual applications or objects intermingled therewith. Gesture recognition and sensing enables implementations to provide the user with the ability to grasp or interact with real objects (e.g., the user's coke can) alongside the virtual (e.g., a virtual document floating above the surface of the user's actual desk. In some implementations, information from differing spectral sources is selectively used to drive one or another aspect of the experience. For example, information from IR sensitive sensors can be used to detect the user's hand motions and recognize gestures. While information from the visible light region can be used to drive the pass through video presentation, creating a real world presentation of real and virtual objects. In a further example, combinations of image information from multiple sources can be used; the system—or the user—selecting between IR imagery and visible light imagery based upon situational, conditional, environmental or other factors or combinations thereof. For example, the device can switch from visible light imaging to IR imaging when the ambient light conditions warrant. The user can have the ability to control the imaging source as well. In yet further examples, information from one type of sensor can be used to augment, correct, or corroborate information from another type of sensor. Information from IR sensors can be used to correct the display of imaging conducted from visible light sensitive sensors, and vice versa. In low-light or other situations not conducive to optical imaging, where free-form gestures cannot be recognized optically with a sufficient degree of reliability, audio signals or vibrational waves can be detected and used to supply the direction and location of the object as further described herein.

Referring first to FIG. 1, which illustrates a system 100 for capturing image data according to one implementation of the technology disclosed. System 100 is preferably coupled to a wearable device 101 that can be a personal head mounted device (HMD) having a goggle form factor such as shown in FIG. 1, a helmet form factor, or can be incorporated into or coupled with a watch, smartphone, or other type of portable device. System 100 includes any number of cameras 102, 104 coupled to sensory processing system 106.

Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 112 by motion of the device 101, in order to view a virtually rendered or virtually augmented view of the region of interest 112 that can include a variety of virtual objects 116 as well as contain an object of interest 114 (in this example, one or more hands) moves within the region of interest 112. One or more sensors 108, 110 capture motions of the device 101. In some implementations, one or more light sources 115, 117 are arranged to illuminate the region of interest 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of cameras 102, 104 to capture images of the region of interest 112 and sensors 108, 110 to capture motions of the device 101. Information from sensors 108, 110 can be applied to models of images taken by cameras 102, 104 to cancel out the effects of motions of the device 101, providing greater accuracy to the virtual experience rendered by device 101. Based on the captured images and motions of the device 101, sensory processing system 106 determines the position and/or motion of object 114.

For example, as an action in determining the motion of object 114, sensory processing system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 101 from sensors 108, 110 allows sensory processing system 106 to determine the location in 3D space of object 114, and analyzing sequences of images allows sensory processing system 106 to reconstruct 3D motion of object 114 using conventional motion algorithms or other techniques. See, e.g., U.S. patent application Ser. No. 13/414,485 (LEAP 1006-7/LPM-1006-7), filed on Mar. 7, 2012 and Ser. No. 13/742,953 (LEAP 1006-8/LPM-001CP2), filed on Jan. 16, 2013, and U.S. Provisional Patent Application No. 61/724,091, filed on Nov. 8, 2012, which are hereby incorporated herein by reference in their entirety.

Presentation interface 120 employs projection techniques in conjunction with the sensory based tracking in order to present virtual (or virtualized real) objects (visual, audio, haptic, and so forth) created by applications loadable to, or in cooperative implementation with, the device 101 to provide a user of the device with a personal virtual experience. Projection can include an image or other visual representation of an object.

Figure 8:
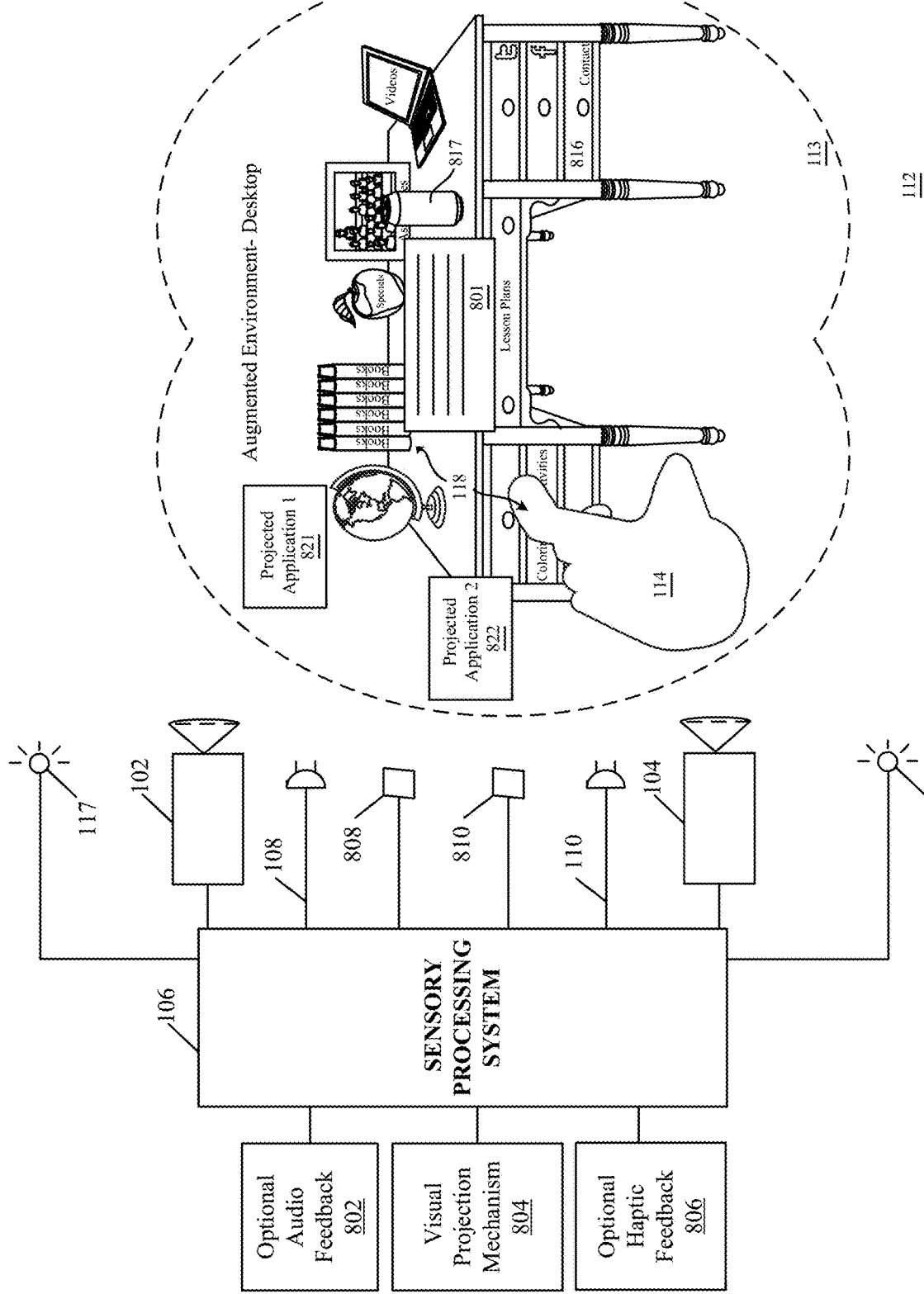
FIG. 8 illustrates one implementation of a system for providing a virtual device experience.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging devices (e.g. cameras 102, 104) or acoustic or other sensory devices. Control information is communicated to a system based in part on a combination of the motion of the portable device 101 and the detected motion of the user determined from the sensory information received from imaging devices (e.g. cameras 102, 104) or acoustic or other sensory devices. The virtual device experience can be augmented in some implementations by the addition of haptic, audio and/or other sensory information projectors. For example, with reference to FIG. 8, optional video projector 804 can project an image of a page (e.g., virtual device 801) from a virtual book object superimposed upon a real world object, e.g., desk 116 being displayed to a user via live video feed; thereby creating a virtual device experience of reading an actual book, or an electronic book on a physical e-reader, even though no book nor e-reader is present. Optional haptic projector 806 can project the feeling of the texture of the "virtual paper" of the book to the reader's finger. Optional audio projector 802 can project the sound of a page turning in response to detecting the reader making a swipe to turn the page. Because it is a virtual reality world, the back side of hand 114 is projected to the user, so that the scene looks to the user as if the user is looking at the user's own hand(s).

A plurality of sensors 108, 110 coupled to the sensory processing system 106 to capture motions of the device 101. Sensors 108, 110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 100 can include any of various other sensors not shown in FIG. 1 for clarity, alone or in various combinations, to enhance the virtual experience provided to the user of device 101. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic or vibrational sensors are sensed. In still another operational mode, a tap or touch gesture may act as a "wake up" signal to bring the sensory processing system 106 from a standby mode to an operational mode. For example, the system 106 may enter the standby mode if optical signals from the cameras 102, 104 are absent for longer than a threshold interval.

It will be appreciated that the figures shown in FIG. 1 are illustrative. In some implementations, it may be desirable to house the system 100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 2:
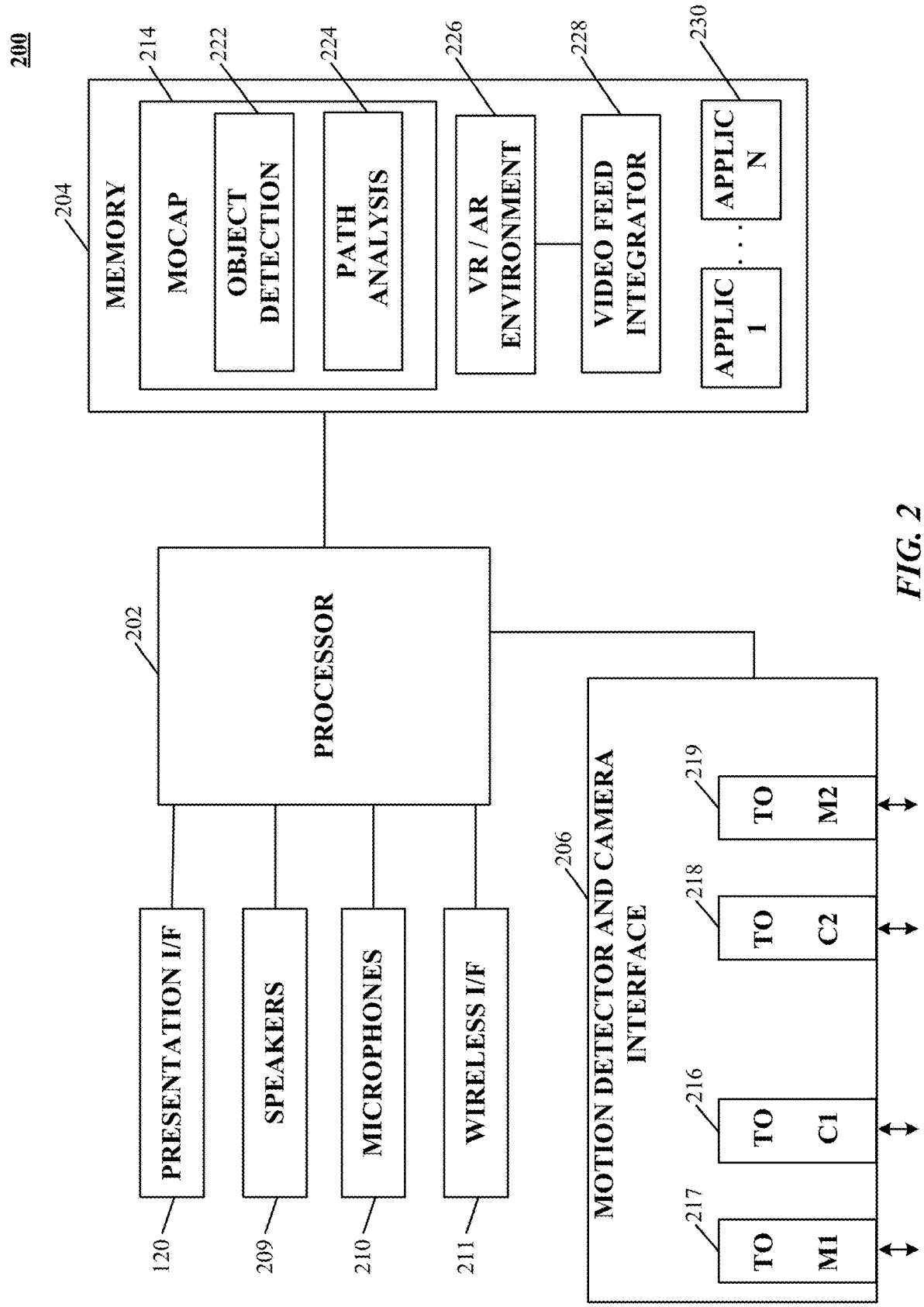
FIG. 2 is a simplified block diagram of a computer system implementing image analysis suitable for supporting a virtual environment enabled apparatus according to an implementation of the technology disclosed.

Refer now to FIG. 2, which shows a simplified block diagram of a computer system 200 for implementing sensory processing system 106. Computer system 200 includes a processor 202, a memory 204, a motion detector and camera interface 206, a presentation interface 120, speaker(s) 209, a microphone(s) 210, and a wireless interface 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Motion detector and camera interface 206 can include hardware and/or software that enables communication between computer system 200 and cameras 102, 104, as well as sensors 108, 110 (see FIG. 1). Thus, for example, motion detector and camera interface 206 can include one or more camera data ports 216, 218 and motion detector ports 217, 219 to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 214 executing on processor 202. In some implementations, motion detector and camera interface 206 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and audio signals from sensors connected to motion detector and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. In some implementations, object analysis module 222 can also analyze audio signals (e.g., audio signals captured via interface 206) to localize the object by, for example, time distance of arrival, multilateration or the like. ("Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC). Path analysis module 224 can track and predict object movements in 3D based on information obtained via the cameras. Some implementations will include a Virtual Reality/Augmented Reality environment manager 226 provides integration of virtual objects reflecting real objects (e.g., hand 114) as well as synthesized objects 116 for presentation to user of device 101 via presentation interface 120 to provide a personal virtual experience. One or more applications 230 can be loaded into memory 204 (or otherwise made available to processor 202) to augment or customize functioning of device 101 thereby enabling the system 200 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis. A video feed integrator 228 provides integration of live video feed from the cameras 102, 104 and one or more virtual objects (e.g., 801 of FIG. 8) using techniques like that of flowchart 1100 of FIG. 11. Video feed integrator governs processing of video information from disparate types of cameras 102, 104. For example, information received from pixels sensitive to IR light and from pixels sensitive to visible light (e.g., RGB) can be separated by integrator 228 and processed differently. Image information from IR sensors can be used for gesture recognition, while image information from RGB sensors can be provided as a live video feed via presentation interface 120. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. Integrator 228 in conjunction with VR/AR environment 226 control the creation of the environment presented to the user via presentation interface 120.

Presentation interface 120, speakers 209, microphones 210, and wireless network interface 211 can be used to facilitate user interaction via device 101 with computer system 200. These components can be of generally conventional design or modified as desired to provide any type of user interaction. In some implementations, results of motion capture using motion detector and camera interface 206 and mocap program 214 can be interpreted as user input. For example, a user can perform hand gestures or motions across a surface that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed to the user of device 101 via presentation interface 120, to use rotating gestures to increase or decrease the volume of audio output from speakers 209, and so on. Path analysis module 224 may represent the detected path as a vector and extrapolate to predict the path, e.g., to improve rendering of action on device 101 by presentation interface 120 by anticipating movement.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object detection module 222 by processor 202 can cause processor 202 to operate motion detector and camera interface 206 to capture images and/or audio signals of an object traveling across and in contact with a surface to detect its entrance by analyzing the image and/or audio data.

Figure 3A:
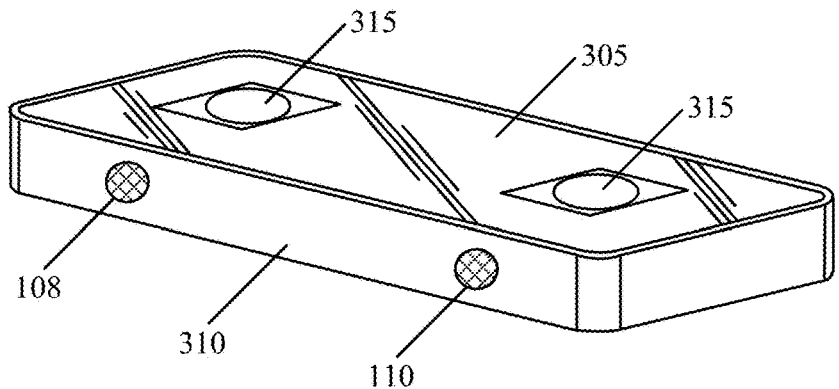
FIG. 3A is a perspective view from the top of a sensor in accordance with the technology disclosed, with motion sensors along an edge surface thereof.
Figure 3B:
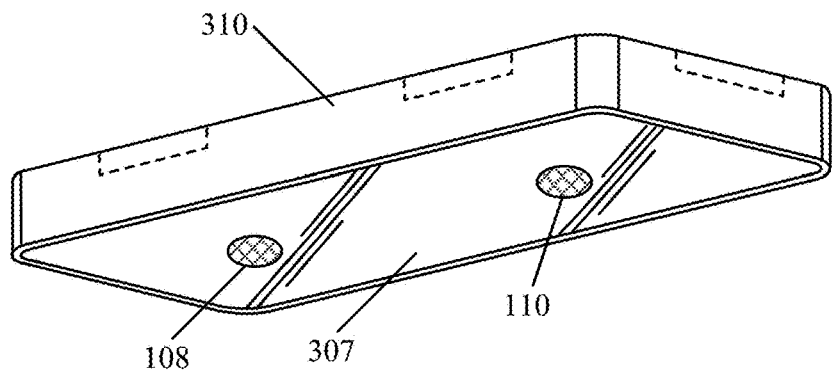
FIG. 3B is a perspective view from the bottom of a sensor in accordance with the technology disclosed, with motion sensors along the bottom surface thereof.
Figure 3C:
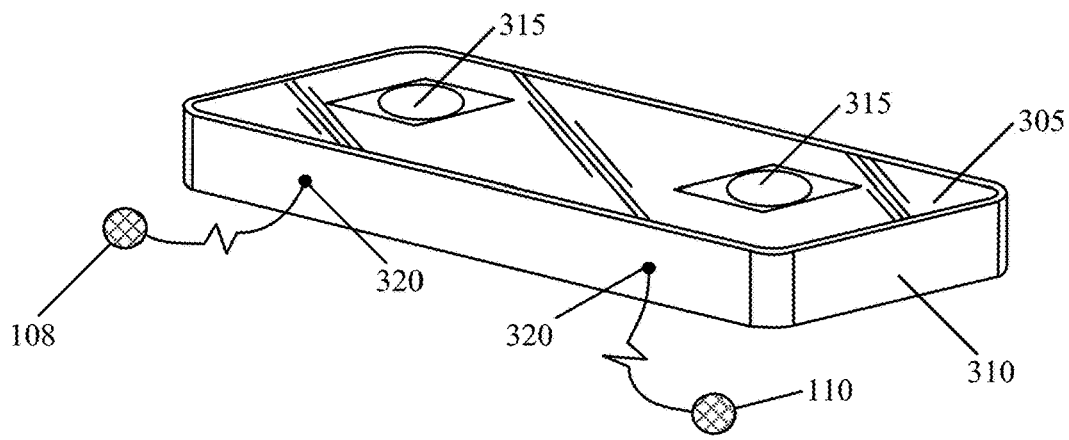
FIG. 3C is a perspective view from the top of a sensor in accordance with the technology disclosed, with detachable motion sensors configured for placement on a surface.

FIGS. 3A, 3B, and 3C illustrate three different configurations of a movable sensor system 300A, 300B, and 300C, with reference to example implementations packaged within a single housing as an integrated sensor. In all cases, sensor 300A, 300B, 300C includes a top surface 305, a bottom surface 307, and a side wall 310 spanning the top and bottom surfaces 305, 307. With reference also to FIG. 3A, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked. In sensor 300A, motion sensors 108, 110 are located on the side wall 310. Desirably, the motion sensors are flush with the surface of side wall 310 so that, the motion sensors are disposed to sense motions about a longitudinal axis of sensor 300A. Of course, the motion sensors can be recessed from side wall 310 internal to the device in order to accommodate sensor operation and placement within available packaging space so long as coupling with the external housing of sensor 300A remains adequate. In sensor 300B, motion sensors 108, 110 are located proximate to the bottom surface 307, once again in a flush or recessed configuration. The top surface of the sensor 300B (not shown in the figure for clarity sake) contains camera windows 315 as shown in FIG. 3A. In FIG. 3C, motion sensors 108, 110 are external contact transducers that connect to sensor 300C via jacks 320. This configuration permits the motion sensors to be located away from the sensor 300C, e.g., if the motion sensors are desirably spaced further apart than the packaging of sensor 300C allows. In other implementations, movable sensor components of FIGS. 3A, 3B and 3C can be imbedded in portable (e.g., head mounted devices (HMDs), wearable goggles, watch computers, smartphones, and so forth) or movable (e.g., autonomous robots, material transports, automobiles (human or machine driven)) devices.

FIG. 4 illustrates apparent movement of objects from the perspective of the user of a virtual environment enabled apparatus 400 in accordance with the technology. FIG. 4 shows two views of a user of a device 101 viewing a field of view 113 at two different times. As shown in block 401, at an initial time to, user is viewing field of view 113a using device 101 in a particular initial position to view an area 113a. As shown in block 402, device 101 presents to user a display of the device field of view 113a that includes objects 114 (hands) in a particular pose. As shown in block 403, subsequently at time t1, the user has repositioned device 101. Accordingly, the apparent position of objects 114 in the field of view 113b shown in block 404 has changed from the apparent position of the objects 114 in field of view 113a. Even in the case where the hands 114 did not move in space, the user sees an apparent movement of the hands 114 due to the change in position of the device.

Now with reference to FIG. 5, an apparent movement of one or more moving objects from the perspective of the user of a virtual environment enabled apparatus 500 is illustrated. As shown by block 502, field of view 113a presented by device 101 at time to includes an object 114. At time to, the position and orientation of tracked object 114 is known with respect to device reference frame 120a, again at time to. As shown by block 404, at time t1, the position and orientation of both device reference frame 120b and tracked object 114 have changed. As shown by block 504, field of view 113b presented by device 101 at time t1 includes object 114 in a new apparent position. Because the device 101 has moved, the device reference frame 120 has moved from an original or starting device reference frame 120a to a current or final reference frame 120b as indicated by transformation T. It is noteworthy that the device 101 can rotate as well as translate. Implementations can provide sensing the position and rotation of reference frame 120b with respect to reference frame 120a and sensing the position and rotation of tracked object 114 with respect to 120b, at time t1. Implementations can determine the position and rotation of tracked object 114 with respect to 120a from the sensed position and rotation of reference frame 120b with respect to reference frame 120a and the sensed position and rotation of tracked object 114 with respect to 120b.

In an implementation, a transformation R is determined that moves dashed line reference frame 120a to dotted line reference frame 120b, without intermediate conversion to an absolute or world frame of reference. Applying the reverse transformation $R^T$ makes the dotted line reference frame 120b lie on top of dashed line reference frame 120a. Then the tracked object 114 will be in the right place from the point of view of dashed line reference frame 120a. (It is noteworthy that $R^T$ is equivalent to $R^{-1}$ for our purposes.) In determining the motion of object 114, sensory processing system 106 can determine its location and direction by computationally analyzing images captured by cameras 102, 104 and motion information captured by sensors 108, 110. For example, an apparent position of any point on the object (in 3D space) at time $$t = t_0 : \begin{bmatrix} x \\ y \\ z \\ 1 \end{bmatrix},$$

can be converted to a real position of the point on the object at time $$t = t_1 : \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}$$

from the frame of reference of the device. We refer to the combination of a rotation and translation, which are not generally commutative, as the affine transformation.

The correct location at time $t=t_1$ of a point on the tracked object with respect to device reference frame 120a is given by an inverse affine transformation, e.g., $$\begin{bmatrix} R_{ref}^T & -R_{ref}^T * T_{ref} \\ 0 & 1 \end{bmatrix}$$

as provided for in equation (1):

$$\begin{bmatrix} R_{ref}^T & \left(-R_{ref}^T\right) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:

$R_{ref}^T$—Represents the rotation matrix part of an affine transform describing the rotation transformation from the device reference frame 120a to the device reference frame 120b.

$T_{ref}$—Represents translation of the device reference frame 120a to the device reference frame 120b.

One conventional approach to obtaining the Affine transform R (from axis unit vector $u=(u_x, u_y, u_z)$, rotation angle $\theta$) method. Wikipedia, at http://en.wikipedia.org/wiki/Rotation_matrix, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) - u_x\sin\theta & \cos\theta + u_z^2(1-\cos\theta) \end{bmatrix}$$

$$-R^T = \begin{bmatrix} -\cos\theta - u_x^2(1-\cos\theta) & -u_y u_x(1-\cos\theta) - u_z\sin\theta & -u_z u_x(1-\cos\theta) + u_y\sin\theta \\ -u_x u_y(1-\cos\theta) + u_z\sin\theta & -\cos\theta - u_y^2(1-\cos\theta) & -u_z u_y(1-\cos\theta) - u_x\sin\theta \\ -u_x u_z(1-\cos\theta) - u_y\sin\theta & -u_y u_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame, $$-R^T * T =$$

$$\begin{bmatrix} \left(-\cos\theta - u_x^2(1-\cos\theta)\right)(a) + \left(-\cos\theta - u_y^2(1-\cos\theta)\right)(b) + (-u_z u_x(1-\cos\theta) + u_y\sin\theta)(c) \\ (-u_x u_y(1-\cos\theta) + u_z\sin\theta)(a) + \left(-\cos\theta - u_y^2(1-\cos\theta)\right)(b) + (-u_z u_y(1-\cos\theta) - u_x\sin\theta)(c) \\ (-u_x u_z(1-\cos\theta) - u_y\sin\theta)(a) + (-u_y u_z(1-\cos\theta) + u_x\sin\theta)(b) + \left(-\cos\theta - u_z^2(1-\cos\theta)\right)(c) \end{bmatrix}$$

In another example, an apparent orientation and position of the object at time $t=t_0$: vector pair $$\begin{bmatrix} R_{obj} & T_{obj} \\ 0 & 1 \end{bmatrix},$$

can be converted to a real orientation and position of the object at time $$t = t_1 : \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked object with respect to device reference frame at time $t=t_0$ (120a) is given by an inverse affine transformation, e.g., $$\begin{bmatrix} R_{ref}^T & -R_{ref}^T * T_{ref} \\ 0 & 1 \end{bmatrix}$$

as provided for in equation (3):

$$\begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:

$R^T_{ref}$—Represents the rotation matrix part of an affine transform describing the rotation transformation from the device reference frame 120a to the device reference frame 120b.

$R_{obj}$—Represents a matrix describing the rotation at $t_0$ of the object with respect to the device reference frame 120b.

$R'_{obj}$—Represents a matrix describing the rotation at t1 of the object with respect to the device reference frame 120a.

$T_{ref}$—Represents a vector translation of the device reference frame 120a to the device reference frame 120b.

$T_{obj}$—Represents a vector describing the position at $t_0$ of the object with respect to the device reference frame 120b.

$T'_{obj}$—Represents a vector describing the position at t1 of the object with respect to the device reference frame 120a.

In a yet further example, an apparent orientation and position of the object at time $t=t_0$: affine transform $$\begin{bmatrix} R_{obj} & T_{obj} \\ 0 & 1 \end{bmatrix},$$

can be converted to a real orientation and position of the object at time $$t = t_1 : \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time $t=t_0$ (120a) is given by an inverse affine transformation, e.g., $$\begin{bmatrix} R_{init}^T & (-R_{init}^T) * T_{init} \\ 0 & 1 \end{bmatrix}$$

as provided for in equation (4):

$$\begin{bmatrix} R_{init}^T & (-R_{init}^T) * T_{init} \\ 0 & 1 \end{bmatrix} \begin{bmatrix} R_{ref}^T & (-R_{ref}^T) * T_{ref} \\ 0 & 1 \end{bmatrix} * \quad (4)$$

$$\begin{bmatrix} R_{obj} & T_{obj} \\ 0 & 1 \end{bmatrix} = \begin{bmatrix} R'_{obj} & T'_{obj} \\ 0 & 1 \end{bmatrix}$$

Where:

$R^T_{init}$—Represents a rotation matrix part of an affine transform describing the rotation transformation at $t_0$ from the world reference frame 119 to the device reference frame 120a.

$R^T_{ref}$—Represents the rotation matrix part of an affine transform describing the rotation transformation from the device reference frame 120a to the device reference frame 120b.

$R_{obj}$—Represents a matrix describing the rotation of the object at $t_0$ with respect to the device reference frame 120b.

$R'_{obj}$—Represents a matrix describing the rotation of the object at $t_1$ with respect to the device reference frame 120a.

$T_{init}$—Represents a vector translation at $t_0$ of the world reference frame 119 to the device reference frame 120a.

$T_{ref}$—Represents a vector translation at $t_1$ of the device reference frame 120a to the device reference frame 120b.

$T_{obj}$—Represents a vector describing the position at $t_0$ of the object with respect to the device reference frame 120b.

$T'_{obj}$—Represents a vector describing the position at $t_1$ of the object with respect to the device reference frame 120a.

In some implementations, the technology disclosed can build a world model with an absolute or world frame of reference. The world model can include representations of object portions (e.g. objects, edges of objects, prominent vortices) and potentially depth information when available from a depth sensor, depth camera or the like, within the viewpoint of the virtual or augmented reality head mounted sensor. The system can build the world model from image information captured by the cameras of the sensor. Points in 3D space can be determined from the stereo-image information are analyzed to obtain object portions. These points are not limited to a hand or other control object in a foreground; the points in 3D space can include stationary background points, especially edges. The model is populated with the object portions.

When the sensor moves (e.g., the wearer of a wearable headset turns her head) successive stereo-image information is analyzed for points in 3D space. Correspondences are made between two sets of points in 3D space chosen from the current view of the scene and the points in the world model to determine a relative motion of the object portions. The relative motion of the object portions reflects actual motion of the sensor.

Differences in points are used to determine an inverse $$\begin{bmatrix} R^T & -R^T * T \\ 0 & 1 \end{bmatrix})$$

between model position and new position of object portions. In this affine transform, $R^T$ describes the rotational portions of motions between camera and object coordinate systems, and T describes the translational portions thereof.

The system then applies an inverse transformation of the object corresponding to the actual transformation of the device (since the sensor, not the background object moves) to determine the translation and rotation of the camera. Of course, this method is most effective when background objects are not moving relative to the world frame (i.e., in free space).

The model can be updated whenever we detect new points not previously seen in the model. The new points are added to the model so that it continually grows.

Of course, embodiments can be created in which (1) device cameras are considered stationary and the world model is considered to move; or (2) the device cameras are considered to be moving and the world model is considered stationary.

The use of a world model described above does not require any gyroscopic, accelerometer or magnetometer sensors, since the same cameras in a single unit (even the same cameras) can sense both the background objects and the control object. In any view where the system can recognize elements of the model, it can re-localize its position and orientation relative to the model and without drifting from sensor data. In some embodiments, motion sensors can be used to seed the frame to frame transformation and therefore bring correspondences between the rendered virtual or augmented reality scenery closer to the sensed control object, making the result less ambiguous (i.e., the system would have an easier time determining what motion of the head had occurred to result in the change in view from that of the model). In a yet further embodiment, sensor data could be used to filter the solution above so that the motions appear to be smoother from frame to frame, while still remaining impervious to drift caused by relying upon motion sensors alone.

Figure 6:
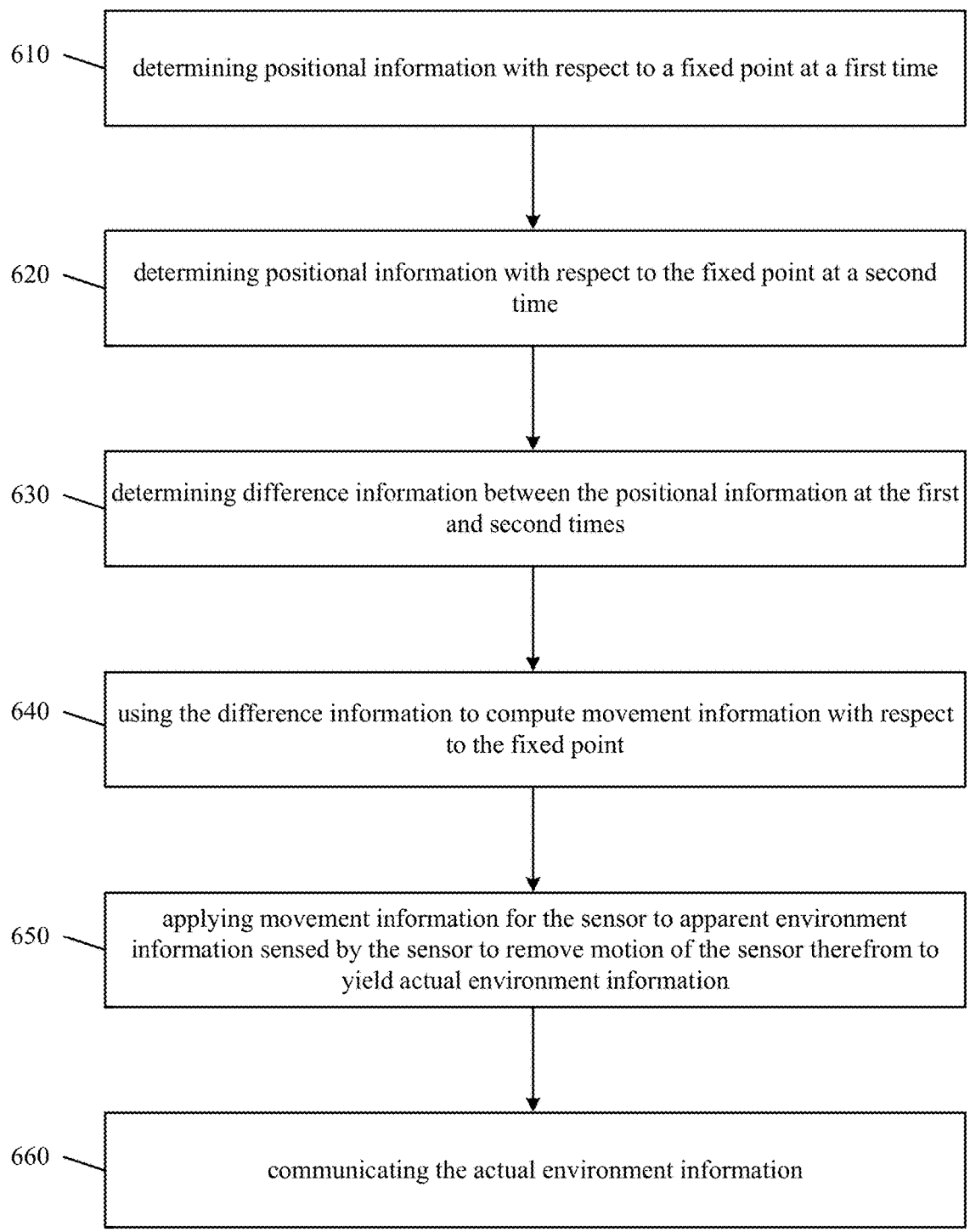
FIG. 6 shows a flowchart of one implementation of determining motion information in a movable sensor apparatus.

FIG. 6 shows a flowchart 600 of one implementation of determining motion information in a movable sensor apparatus. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 610, a first positional information of a portable or movable sensor is determined with respect to a fixed point at a first time. In one implementation, first positional information with respect to a fixed point at a first time $t=t_0$ is determined from one or motion sensors integrated with, or coupled to, a device including the portable or movable sensor. For example, an accelerometer can be affixed to device 101 of FIG. 1 of sensor 300A, 300B, and 300C in FIGS. 3A, 3B, and 3C, to provide acceleration information over time for the portable or movable device or sensor. Acceleration as a function of time can be integrated with respect to time (e.g., by sensory processing system 106) to provide velocity information over time, which can be integrated again to provide positional information with respect to time. In another example, gyroscopes, magnetometers or the like can provide information at various times from which positional information can be derived. These items are well known in the art and their function can be readily implemented by those possessing ordinary skill. In another implementation, a second motion-capture sensor (e.g., such as sensor 300A, 300B, and 300C in FIGS. 3A, 3B, and 3C for example) is disposed to capture position information of the first sensor (e.g., affixed to 101 of FIG. 1 or sensor 300A, 300B, and 300C in FIGS. 3A, 3B, and 3C) to provide positional information for the first sensor.

At action 620, a second positional information of the sensor is determined with respect to the fixed point at a second time $t=t_1$.

At action 630, difference information between the first positional information and the second positional information is determined.

At action 640, movement information for the sensor with respect to the fixed point is computed based upon the difference information. Movement information for the sensor with respect to the fixed point is can be determined using techniques such as discussed above with reference to equations (2).

At action 650, movement information for the sensor is applied to apparent environment information sensed by the sensor to remove motion of the sensor therefrom to yield actual environment information. Motion of the sensor can be removed using techniques such as discussed above with reference to FIGS. 4-5.

At action 660, actual environment information is communicated.

Figure 7:
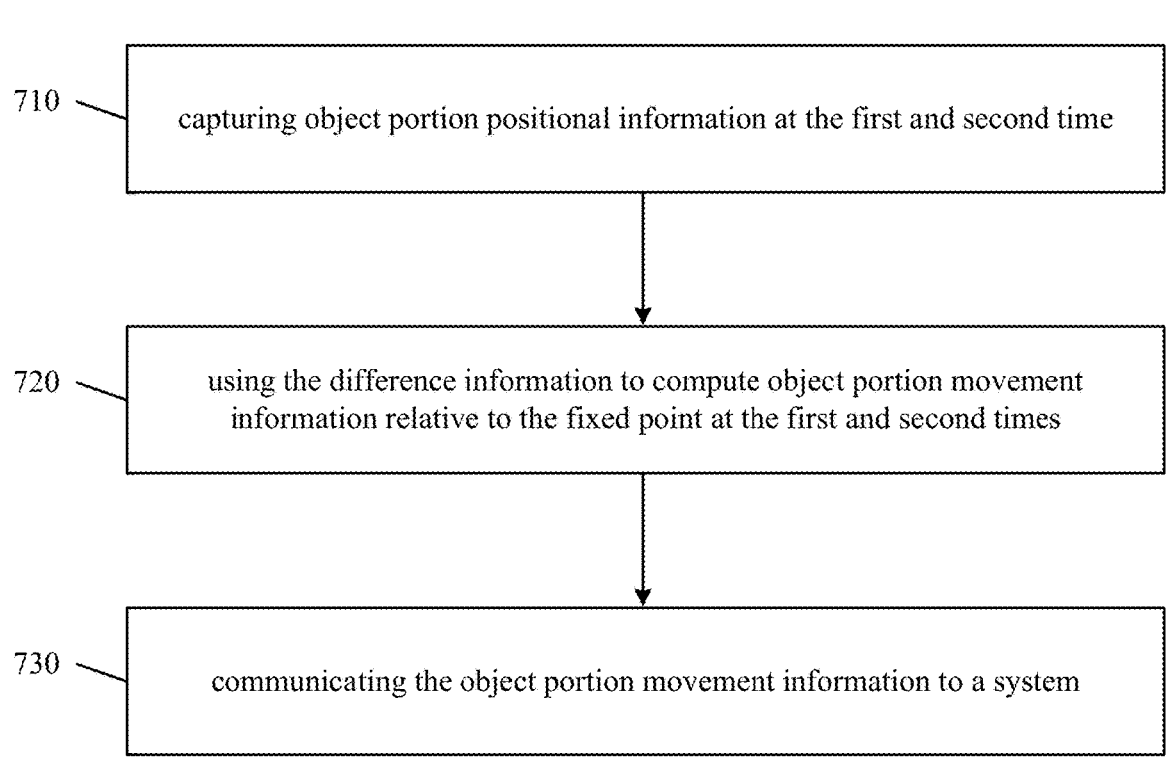
FIG. 7 shows a flowchart of one implementation of applying movement information to apparent environment information sensed by the sensor to yield actual environment information in a movable sensor apparatus.

FIG. 7 shows a flowchart 700 of one implementation of applying movement information for the sensor to apparent environment information (e.g., apparent motions of objects in the environment 112 as sensed by the sensor) to remove motion of the sensor therefrom to yield actual environment information (e.g., actual motions of objects in the environment 112 relative to the reference frame 120a). Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 710, positional information of an object portion at the first time and the second time are captured.

At action 720, object portion movement information relative to the fixed point at the first time and the second time is computed based upon the difference information and the movement information for the sensor.

At action 730, object portion movement information is communicated to a system.

Some implementations will be applied to virtual reality or augmented reality applications. For example, and with reference to FIG. 8, which illustrates a system 800 for projecting a virtual device augmented reality experience 801 including one or more real objects, e.g., a desk surface medium 116 according to one implementation of the technology disclosed. System 800 includes a sensory processing system 106 controlling a variety of sensors and projectors, such as for example one or more cameras 102, 104 (or other image sensors) and optionally some illumination sources 115, 117 comprising an imaging system. Optionally, a plurality of vibrational (or acoustical) sensors 808, 810 positioned for sensing contacts with desk 116 can be included. Optionally projectors under control of system 106 can augment the virtual device experience 801, such as an optional audio projector 802 to provide for example audio feedback, optional video projector 804, an optional haptic projector 806 to provide for example haptic feedback to a user of virtual device experience 801. For further information on projectors, reference may be had to "Visio-Tactile Projector" YouTube (https://www.youtube.com/watch?v=BbOhNMxxewg) (accessed Jan. 15, 2014). In operation, sensors and projectors are oriented toward a region of interest 112, that can include at least a portion of a desk 116, or free space 112 in which an object of interest 114 (in this example, a hand) moves along the indicated path 118. One or more applications 821 and 822 can be provided as virtual objects integrated into the display of the augmented reality 113. Accordingly, user (e.g., owner of hand 114) is able to interact with real objects e.g., desk 816, cola 817, in the same environment as virtual objects 801.

Figure 9:
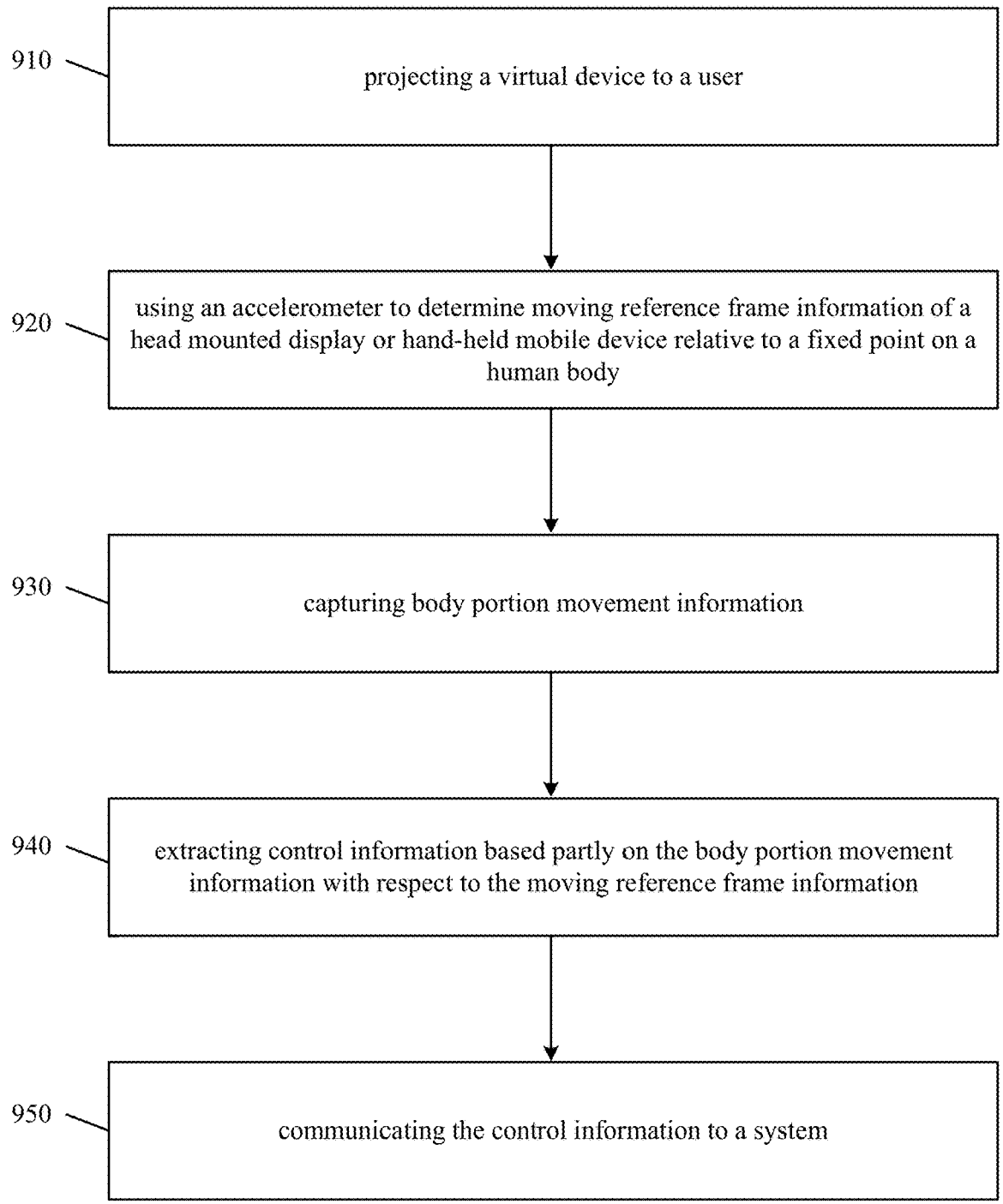
FIG. 9 shows a flowchart of one implementation of providing a virtual device experience.

FIG. 9 shows a flowchart 900 of one implementation of providing a virtual device experience. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, a virtual device is projected to a user. Projection can include an image or other visual representation of an object. For example, visual projection mechanism 120 of FIG. 8 can project a page (e.g., virtual device 801) from a book into a virtual environment 801 (e.g., surface portion 116 or in space 112) of a reader; thereby creating a virtual device experience of reading an actual book, or an electronic book on a physical e-reader, even though no book nor e-reader is present. In some implementations, optional haptic projector 806 can project the feeling of the texture of the "virtual paper" of the book to the reader's finger. In some implementations, optional audio projector 802 can project the sound of a page turning in response to detecting the reader making a swipe to turn the page.

At action 920, using an accelerometer, moving reference frame information of a head mounted device (or hand-held mobile device) relative to a fixed point on a human body is determined.

At action 930, body portion movement information is captured. Motion of the body portion can be detected via sensors 108, 110 using techniques such as discussed above with reference to FIG. 6.

At action 940, control information is extracted based partly on the body portion movement information with respect to the moving reference frame information. For example, repeatedly determining movement information for the sensor and the object portion at successive times and analyzing a sequence of movement information can be used to determine a path of the object portion with respect to the fixed point. For example, a 3D model of the object portion can be constructed from image sensor output and used to track movement of the object over a region of space. The path can be compared to a plurality of path templates and identifying a template that best matches the path. The template that best matches the path control information to a system can be used to provide the control information to the system. For example, paths recognized from an image sequence (or audio signal, or both) can indicate a trajectory of the object portion such as a gesture of a body portion.

At action 950, control information can be communicated to a system. For example, a control information such as a command to turn the page of a virtual book can be sent based upon detecting a swipe along the desk surface of the reader's finger. Many other physical or electronic objects, impressions, feelings, sensations and so forth can be projected onto surface 116 (or in proximity thereto) to augment the virtual device experience and applications are limited only by the imagination of the user.

Figure 10:
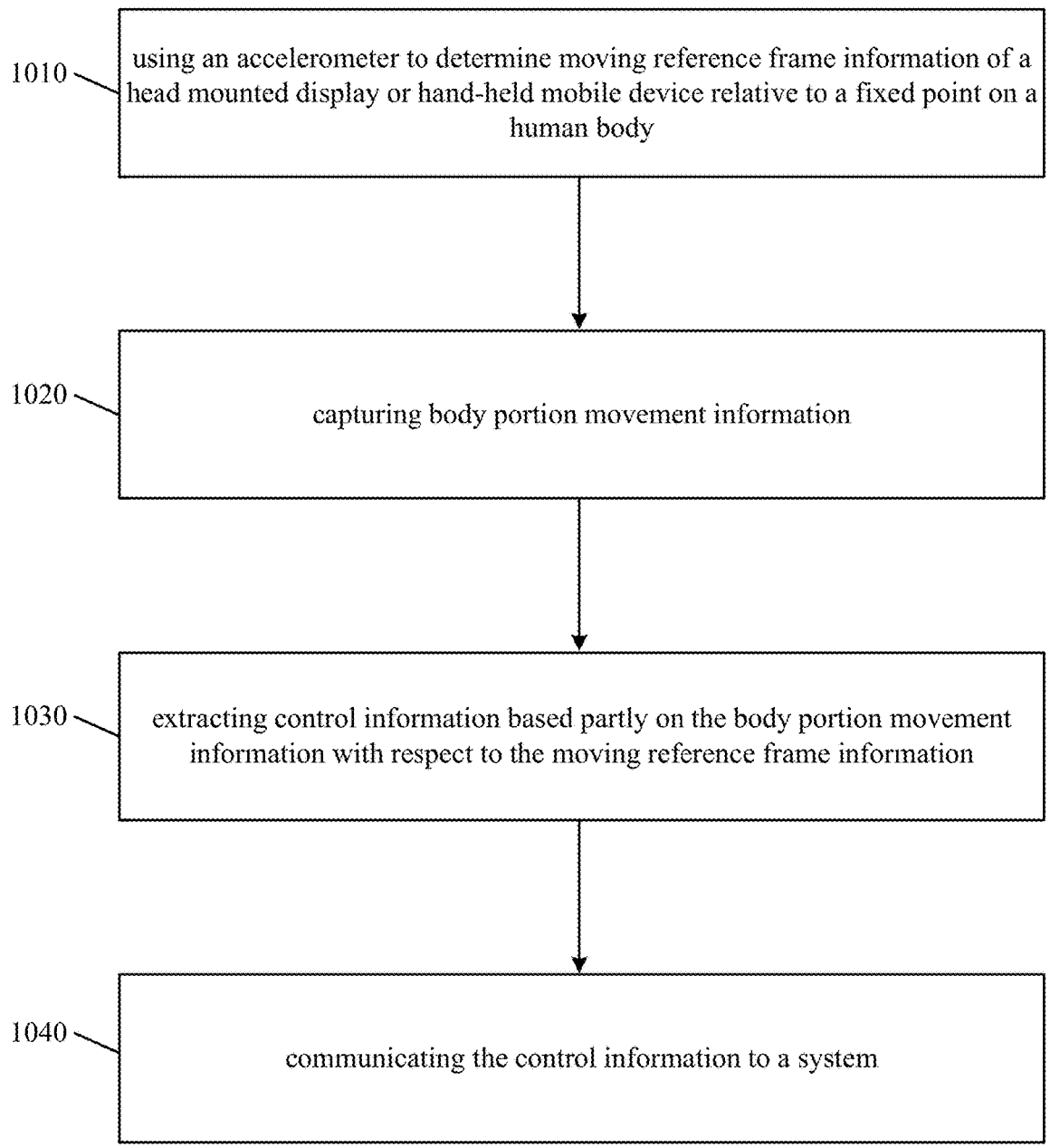
FIG. 10 shows a flowchart of one implementation of cancelling drift in a head mounted device (HMD).

FIG. 10 shows a flowchart 1000 of one implementation of cancelling drift in a head mounted device (HMD). Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, using an accelerometer, moving reference frame information of a head mounted device (or hand-held mobile device) relative to a fixed point on a human body is determined.

At action 1020, body portion movement information is captured.

At action 1030, control information is extracted based partly on the body portion movement information with respect to the moving reference frame information.

At action 1040, the control information is communicated to a system.

Figure 11:
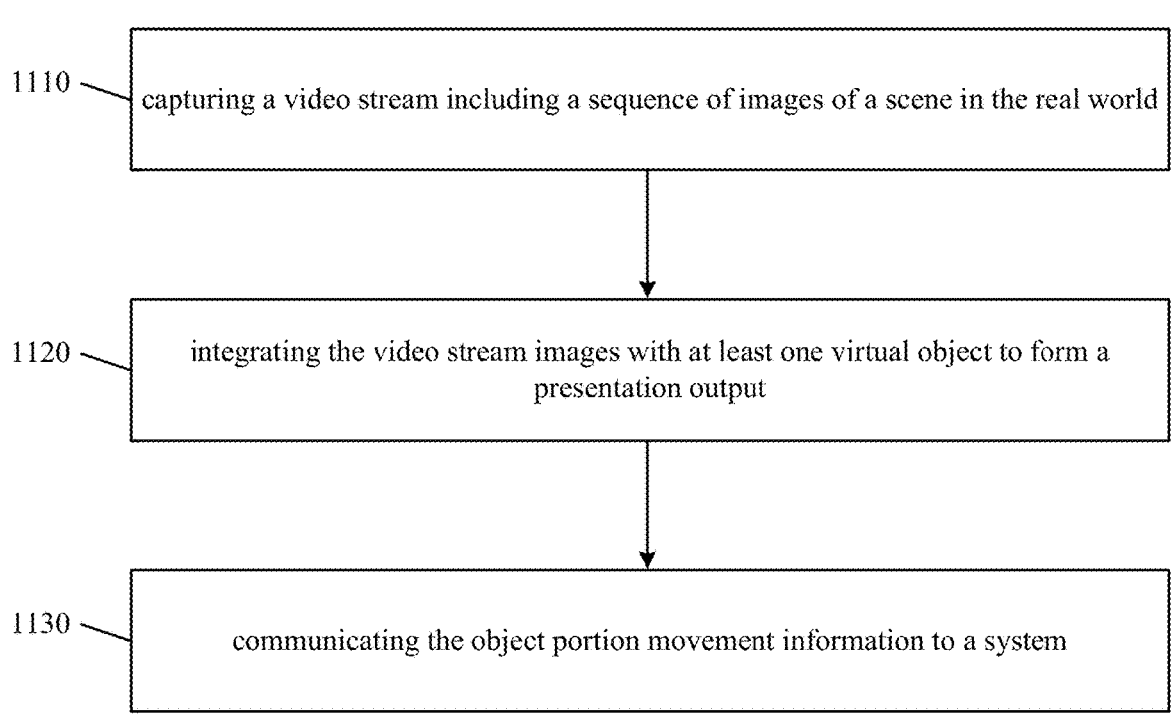
FIG. 11 shows a flowchart of one implementation of providing real world viewing capabilities to a user of a head mounted device (HMD).

FIG. 11 shows a flowchart 1100 of one implementation of providing real world viewing capabilities to a user of a head mounted device (HMD). Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, a video stream including a sequence of images of a scene in the real world is captured using e.g., capturing video with one or more cameras on a head mounted device (HMD) having a set of RGB pixels and a set of IR pixels. In one implementation, a camera or cameras having pixels sensitive to visible light and IR light are used.

At action 1120, the video stream images can be integrated with at least one virtual object to form a presentation output. In one implementation, ambient lighting conditions are determined and information from the set of RGB pixels is displayed in normal lighting conditions and information from the set of IR pixels is displayed in dark lighting conditions. In one implementation, the device 101 dynamically switches between input from a first set of cameras having pixels sensitive to visible light and a second set of cameras having pixels sensitive to IR light based on ambient light conditions. In one implementation, information from the set of IR pixels is used to enhance the information from the set of RGB pixels for low-light conditions.

In one implementation, information from the IR sensitive pixels is separated out for processing to recognize gestures;

while the information from the RGB sensitive pixels is provided to presentation I/F 120 as a live video feed; thereby enabling conserving bandwidth to the gesture recognition processing.

At action 1130, the presentation output is displayed to a user of the wearable sensor system. In one implementation, a pass-through of live video is provided to the presentation I/F 120 for display to the user. In one implementation, the user can selectively switch between video information captured using RGB sensitive pixels, video information captured using IR sensitive pixels, or combinations of both types of information for display.

Figure 12:
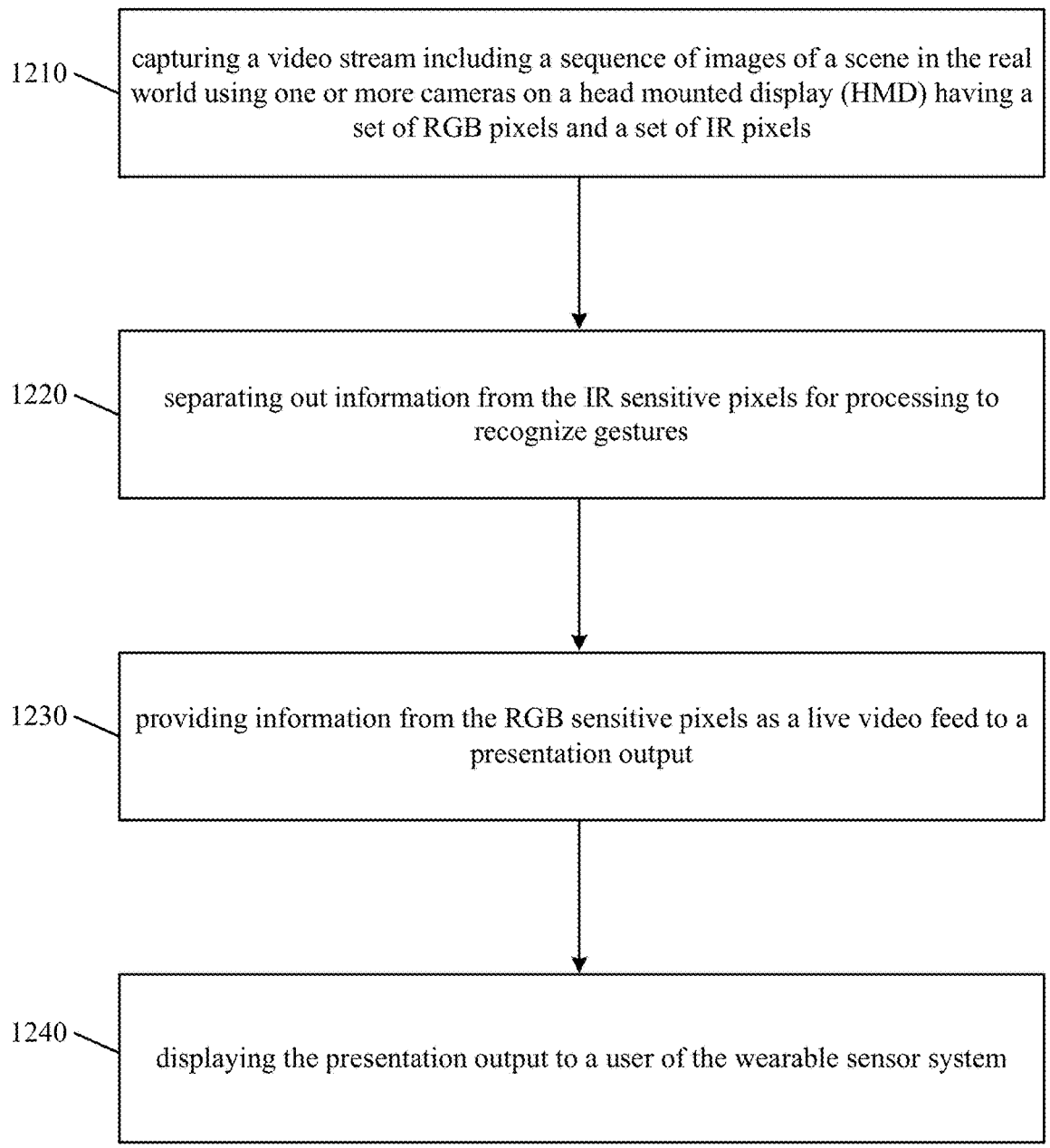
FIG. 12 shows a flowchart of one implementation of providing presentation output to a user of a head mounted device (HMD).

FIG. 12 shows a flowchart 1200 of one implementation of providing presentation output to a user of a head mounted device (HMD). Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

At action-1210 a video stream including a sequence of images of a scene in the real world is captured using one or more cameras on a head mounted device (HMD) having a set of RGB pixels and a set of IR pixels.

At action 1220, information from the IR sensitive pixels is separated out for processing to recognize gestures. The images can be correlated to construct a 3-D model(s) of real world object(s), including position and shape. A succession of images can be analyzed to model motion(s) and/or position(s) of object(s) surrounding the user.

At action 1230, information from the RGB sensitive pixels is provided as a live video feed to a presentation output across multiple images.

At action 1240, the presentation output is displayed to a user of the wearable sensor system. In one implementation, a virtual object or objects can be integrated with the video stream images to form the presentation output.

Figure 13:
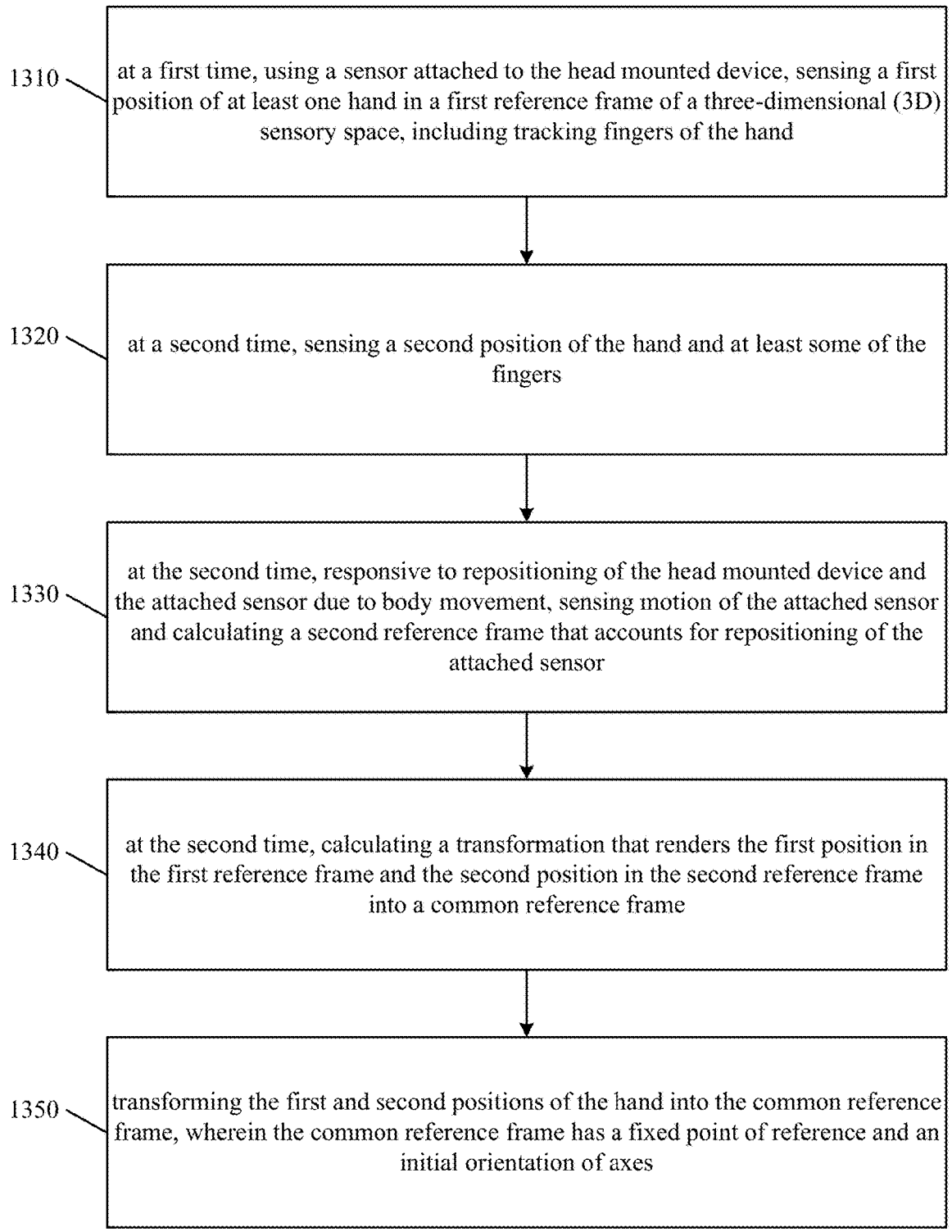
FIG. 13 illustrates a flowchart of a representative method of integrating real three-dimensional (3D) space sensing with a head mounted device that renders a virtual background and one or more virtual objects is described.

FIG. 13 illustrates a flowchart 1300 of a representative method of integrating real three-dimensional (3D) space sensing with a head mounted device that renders a virtual background and one or more virtual objects is described. Flowchart shown in FIG. 13 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 13. Multiple actions can be combined in some implementations. For convenience, this flowchart is described with reference to the system that carries out a method. The system is not necessarily part of the method.

At action 1310, a sensor attached to the head mounted device is used to sense a first position of at least one hand, at a first time, in a first reference frame of a three-dimensional (3D) sensory space. In one implementation, tracking the hand includes tracking fingers of the hand.

At action 1320, a second position of the hand and at least some of the fingers is sensed at a second time.

At action 1330, responsive to repositioning of the head mounted device and the attached sensor due to body movement, motion of the attached sensor is sensed and a second reference frame that accounts for repositioning of the attached sensor is calculated.

At action 1340, a transformation is calculated, which renders the first position in the first reference frame and the second position in the second reference frame into a common reference frame.

At action 1350, the first and second positions of the hand are transformed into the common reference frame. In one implementation, the common reference frame has a fixed point of reference and an initial orientation of axes.

In one implementation, the common reference frame is a world reference frame that does not change as the attached sensor is repositioned. In another implementation, the common reference frame is the second reference frame.

In some implementations, the attached sensor is integrated into a unit with the virtual reality head mounted device. In other implementations, the transforming the first and second positions of the hand into the common reference frame further includes applying at least one affine transformation.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 14 depicts a representative method 1400 of smoothly transitioning between an immersive virtual environment and a convergent physical real environment during an augmented hybrid experience. Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this flowchart is described with reference to the system that carries out a method. The system is not necessarily part of the method.

At action 1410, at least one camera is used to capture a sequence of images of a physical real environment in convergence with an immersive virtual environment during an augmented hybrid experience. In some implementations, the camera is mounted on a head mounted device (HMD), which provides the augmented hybrid experience.

Convergence between a real environment and an immersive virtual environment can be for example temporal, spatial, or temporal and spatial. For example, a spatial convergence can include display of real and virtual objects related to the space in which the viewer is casting their gaze, such as a virtual "application" and a real cola can made available for interaction with an otherwise real desk within the field of view of the viewer. Temporal convergence can include display of something going on in another space (e.g., behind the viewer, or in another room) at the same time using a window or panel (e.g., a virtual rear view mirror) embedded within the visual field of view of the viewer." An example of a convergence that is spatial but not temporal would be a ghost story application that plays scenes from a haunted house's past depending upon the room that the viewer is in. Other examples consistent with these and other forms of convergence are also contemplated in other implementations.

At action 1420, the immersive virtual environment is automatically interrupted and a live feed (video and/or audio information) of the physical real environment is automatically substituted in the augmented hybrid experience in response to a command input. In one implementation, the command input is automatically triggered in response to a free-form gesture. In another implementation, the command input is automatically triggered in response to an audio signal. In yet another implementation, the command input is automatically triggered in response to a vibrational signal. In a further implementation, the command input is automatically triggered in response to an optical signal.

At action 1430, at least one virtual object of the immersive virtual environment and at least one physical object of the physical real environment are simultaneously manipulated during the augmented hybrid experience in response to a command input.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

The method also includes, at a first time t0, using a sensor attached to the HMD, sensing a first position of at least one physical object in a first reference frame of the physical real environment, including tracking portions of the physical object. It also includes causing display of a first virtual representation of the physical object at the first position, wherein the first virtual representation is rendered in the immersive virtual environment of the HMD. The method further includes, at a second time t1, sensing, in the physical real environment, a second position of the physical object and at least some of the portions different from the first position responsive to repositioning of the physical real environment and the attached sensor due to body movement of a user wearing the HMD, wherein the physical object has not moved in the physical real environment between t0 and t1. It also includes causing display of a second virtual representation of the physical object at an actual second position.

In some implementations, causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame, wherein the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, transforming the first and second positions of the physical object into the common reference frame further includes applying an affine transformation.

In other implementations, the method further includes determining the orientation of the physical object at the first position with respect to the first reference frame and causing the display of the physical object accordingly.

In yet other implementations, the method also includes determining the orientation of the physical object at the second position with respect to the second reference frame and causing the display of the physical object accordingly.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 15 shows a flowchart 1500 of one implementation of smoothly transitioning between an immersive virtual environment and a convergent mixed reality environment during an augmented hybrid experience. Flowchart 1500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this flowchart is described with reference to the system that carries out a method. The system is not necessarily part of the method.

At action 1510, at least one camera is used to capture a sequence of images of a physical real environment in convergence with an immersive virtual environment during an augmented hybrid experience. In some implementations, the camera is mounted on a head mounted device (HMD), which provides the augmented hybrid experience.

Convergence between a real environment and an immersive virtual environment can be for example temporal, spatial, or temporal and spatial. For example, a spatial convergence can include display of real and virtual objects related to the space in which the viewer is casting their gaze, such as a virtual "application" and a real cola can made available for interaction with an otherwise real desk within the field of view of the viewer. Temporal convergence can include display of something going on in another space (e.g., behind the viewer, or in another room) at the same time using a window or panel (e.g., a virtual rear view mirror) embedded within the visual field of view of the viewer." An example of a convergence that is spatial but not temporal would be a ghost story application that plays scenes from a haunted house's past depending upon the room that the viewer is in. Other examples consistent with these and other forms of convergence are also contemplated in other implementations.

At action 1520, in response to a command input, the immersive virtual environment is automatically interrupted and at least one virtual object of the immersive virtual environment is automatically superimposed in the physical real environment to generate data representing a mixed reality environment during the augmented hybrid experience. The mixed reality environment includes at least one virtual object of the immersive virtual environment and at least one physical object of the physical real environment.

In one implementation, the command input is automatically triggered in response to a free-form gesture. In another implementation, the command input is automatically triggered in response to an audio signal. In yet another implementation, the command input is automatically triggered in response to a vibrational signal. In a further implementation, the command input is automatically triggered in response to an optical signal.

At action 1530, at least one virtual object of the immersive virtual environment and at least one physical object of the physical real environment are simultaneously manipulated during the augmented hybrid experience in response to a command input.

This method and other implementations of the technology disclosed can include one or more of the following features and/or features described in connection with additional methods disclosed.

The method also includes, at a first time t0, using a sensor attached to the HMD, sensing a first position of at least one physical object in a first reference frame of the physical real environment, including tracking portions of the physical object. It also includes causing display of a first virtual representation of the physical object at the first position, wherein the first virtual representation is rendered in the immersive virtual environment of the HMD. The method further includes, at a second time t1, sensing, in the physical real environment, a second position of the physical object and at least some of the portions different from the first position responsive to repositioning of the physical real environment and the attached sensor due to body movement of a user wearing the HMD, wherein the physical object has not moved in the physical real environment between t0 and t1. It also includes causing display of a second virtual representation of the physical object at an actual second position.

In some implementations, causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame, wherein the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, transforming the first and second positions of the physical object into the common reference frame further includes applying an affine transformation.

In other implementations, the method further includes determining the orientation of the physical object at the first position with respect to the first reference frame and causing the display of the physical object accordingly.

In yet other implementations, the method also includes determining the orientation of the physical object at the second position with respect to the second reference frame and causing the display of the physical object accordingly.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 16:
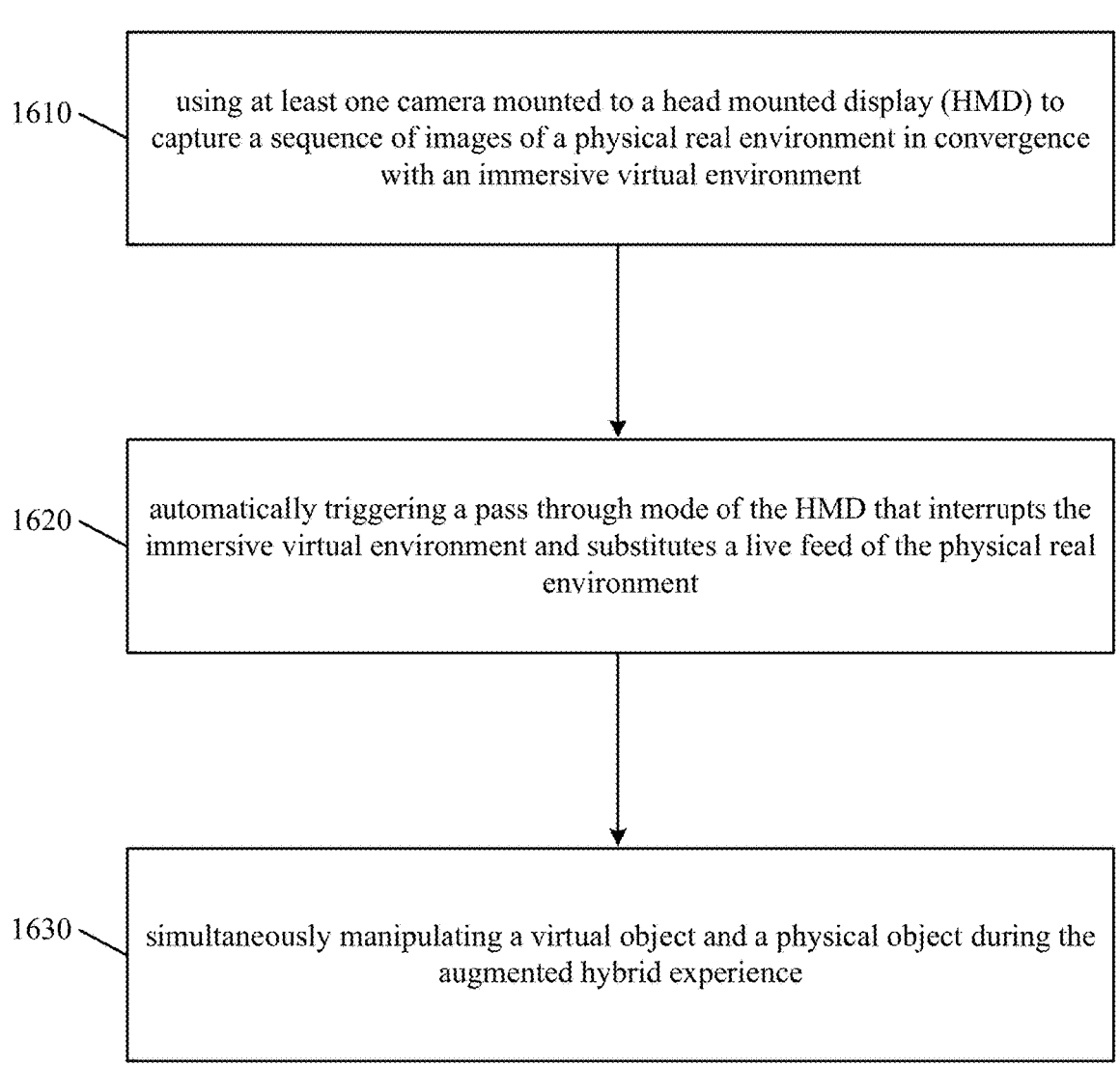
FIG. 16 illustrates one implementation of a method of smoothly transitioning between an immersive virtual environment and a convergent physical real environment during an augmented hybrid experience.

FIG. 16 illustrates one implementation of a method 1600 of smoothly transitioning between an immersive virtual environment and a convergent physical real environment during an augmented hybrid experience generated by a head mounted device (HMD). Flowchart 1600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 16. Multiple actions can be combined in some implementations. For convenience, this flowchart is described with reference to the system that carries out a method. The system is not necessarily part of the method.

At action 1610, at least one camera mounted to a head mounted device (HMD) is used to capture a sequence of images of a physical real environment in convergence with an immersive virtual environment during an augmented hybrid experience generated by the HMD.

Convergence between a real environment and an immersive virtual environment can be for example temporal, spatial, or temporal and spatial. For example, a spatial convergence can include display of real and virtual objects related to the space in which the viewer is casting their gaze, such as a virtual "application" and a real cola can made available for interaction with an otherwise real desk within the field of view of the viewer. Temporal convergence can include display of something going on in another space (e.g., behind the viewer, or in another room) at the same time using a window or panel (e.g., a virtual rear view mirror) embedded within the visual field of view of the viewer." An example of a convergence that is spatial but not temporal would be a ghost story application that plays scenes from a haunted house's past depending upon the room that the viewer is in. Other examples consistent with these and other forms of convergence are also contemplated in other implementations.

At action 1620, a pass through mode of the HMD is automatically triggered in response to a command input. The pass through mode interrupts the immersive virtual environment and substitutes a live feed (video and/or audio information) of the physical real environment in the augmented hybrid experience.

At action 1630, at least one virtual object of the immersive virtual environment and at least one physical object of the physical real environment are simultaneously manipulated during the augmented hybrid experience in response to a command input.

This method and other implementations of the technology disclosed can include one or more of the following features and/or features described in connection with additional methods disclosed.

The method also includes, at a first time t0, using a sensor attached to the HMD, sensing a first position of at least one physical object in a first reference frame of the physical real environment, including tracking portions of the physical object. It also includes causing display of a first virtual representation of the physical object at the first position, wherein the first virtual representation is rendered in the immersive virtual environment of the HMD. The method further includes, at a second time t1, sensing, in the physical real environment, a second position of the physical object and at least some of the portions different from the first position responsive to repositioning of the physical real environment and the attached sensor due to body movement of a user wearing the HMD, wherein the physical object has not moved in the physical real environment between t0 and t1. It also includes causing display of a second virtual representation of the physical object at an actual second position.

In some implementations, causing display of a second virtual representation of the physical object at an actual second position further includes sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the physical object into the common reference frame, wherein the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, transforming the first and second positions of the physical object into the common reference frame further includes applying an affine transformation.

In other implementations, the method further includes determining the orientation of the physical object at the first position with respect to the first reference frame and causing the display of the physical object accordingly.

In yet other implementations, the method also includes determining the orientation of the physical object at the second position with respect to the second reference frame and causing the display of the physical object accordingly.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 17 illustrates one implementation of an augmented hybrid experience 1700 in which a user 1704 interacts with an immersive virtual environment 1708 (shown in FIG. 18) that takes command inputs performed in a physical real environment 1702. In FIG. 17, user 1704 is immersed in the virtual environment 1708 in which user 1704 manipulates virtual objects using hands 114A and 114B, as described in the discussion of FIG. 8. While immersed in virtual environment 1708 and interacting with virtual objects via various gestures (e.g. punch, kick, wave, clap, jump, walk, run, or throw), user 1704 is not able to view the physical real environment 1702 that includes a physical object 1706 (e.g. refrigerator).

This digital immersion results in a situational awareness loss, which can cause the user 1704 to accidently collide with refrigerator 1706. The technology disclosed solves the technical problem of situational awareness loss in an immersive virtual environment (like 1708) by allowing user 1704 to seamlessly switch from an immersive virtual environment (like 1708) to a physical real environment (like 1702).

Figure 18:
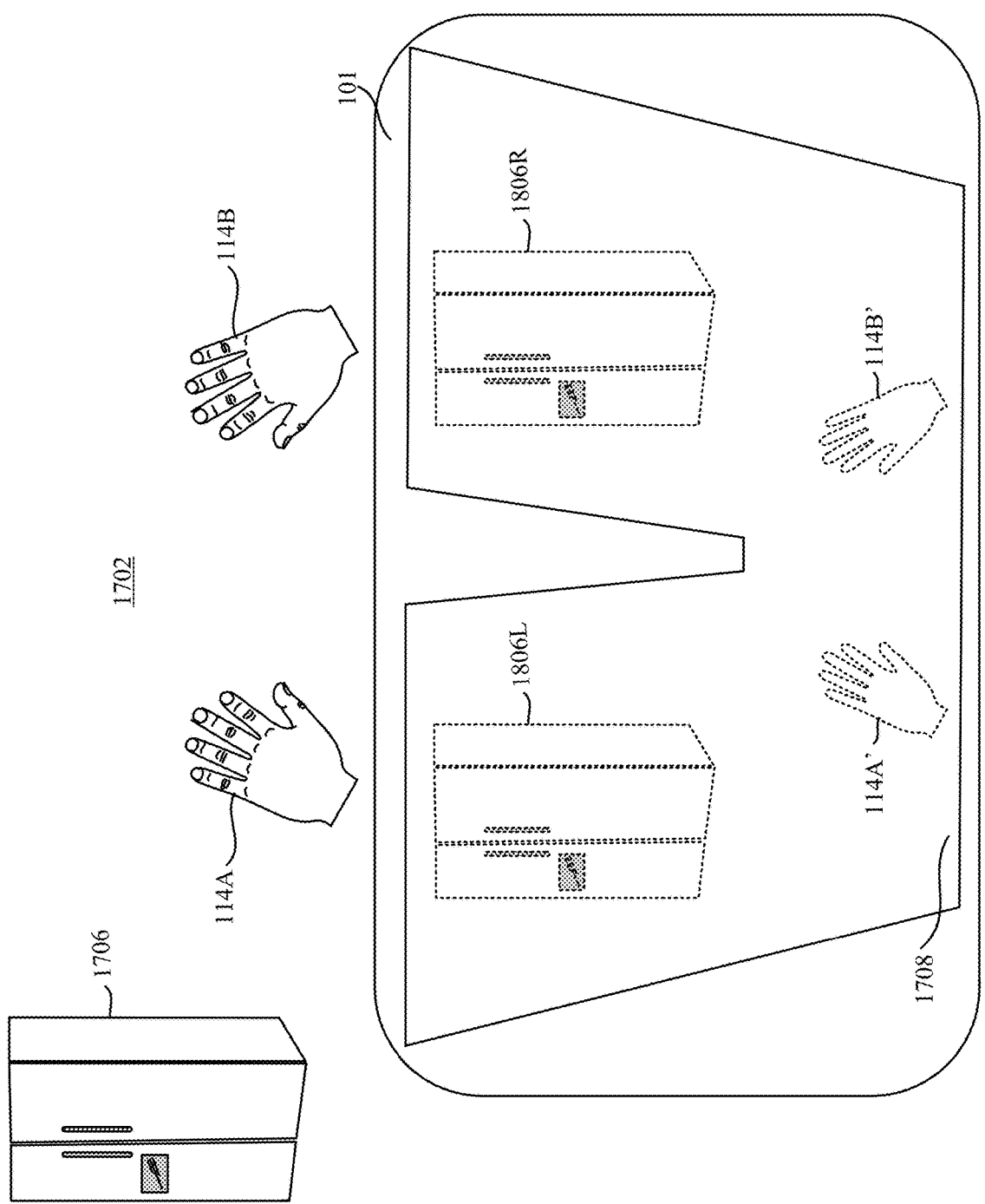
FIG. 18 shows one implementation of smoothly transitioning between an immersive virtual environment and a physical real environment by triggering a pass through mode.

FIG. 18 shows one implementation of smoothly transitioning between an immersive virtual environment 1708 and a physical real environment 1702 by triggering a pass through mode 1800. Pass through mode 1800 virtualizes the physical object 1706 into the immersive virtual environment 1708 displayed to the user 1704 via the HMD 101. As depicted in FIG. 18, virtual representations 1806R and 1806L of the refrigerator 1706 are injected into the immersive virtual environment 1708 along with other virtual objects 114A' and 114B' for viewing by the user 1704.

Figure 19:
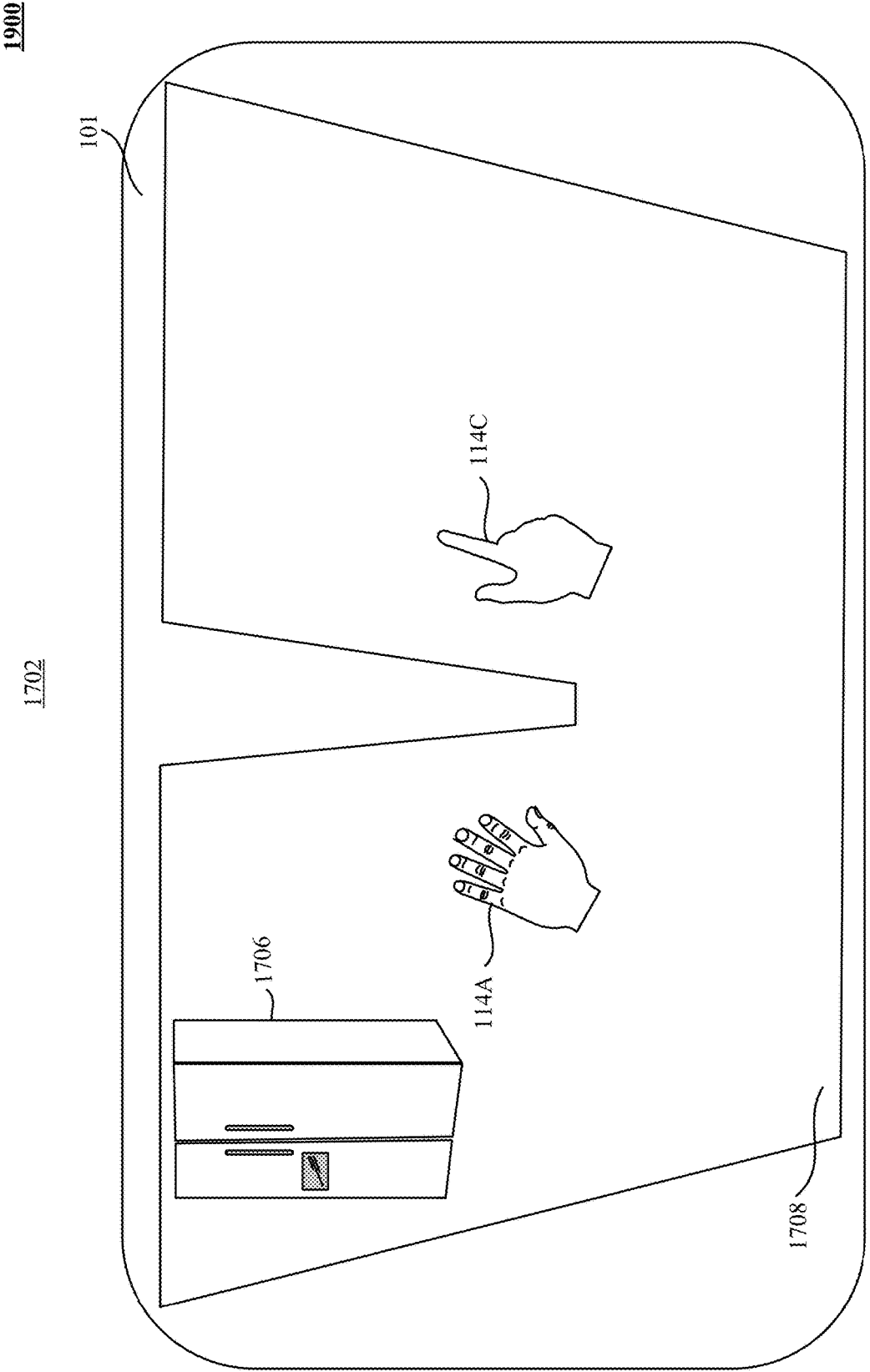
FIG. 19 illustrates one implementation of triggering a pass through mode in response to a command input.

FIG. 19 illustrates one implementation of triggering a pass through mode 1900 in response to a command input 114C. In particular, FIG. 19 shows that pass through mode 1900 is initiated by a pointing gesture 114C performed by user 1704 of HMD 101 and interrupting the immersive virtual environment 1708. In other implementations, pass through mode 1900 is entered in response to an optical, audio or vibrational command input. In pass through mode 1900, a live feed (video and/or audio information) of the physical real environment 1702 is displayed to user 1704. In some implementation of pass through mode 1900, immersive virtual environment 1708 displayed to the user 1704 via the HMD 101 becomes transparent to allow the user 1704 to view the actual real world physical objects, such as refrigerator 1706 and hands 114A and 114C. In other implementations, pass through mode 1900 incorporates the live feed (video and/or audio information) of physical real environment 1702 while continuing to maintain the immersive virtual environment 1708. For instance, the actual real world physical objects refrigerator 1706 and hands 114A and 114C are displayed (translucently or otherwise) to user 1704 in conjunction with the other virtual objects 114A' and 114B'.

Figure 20:
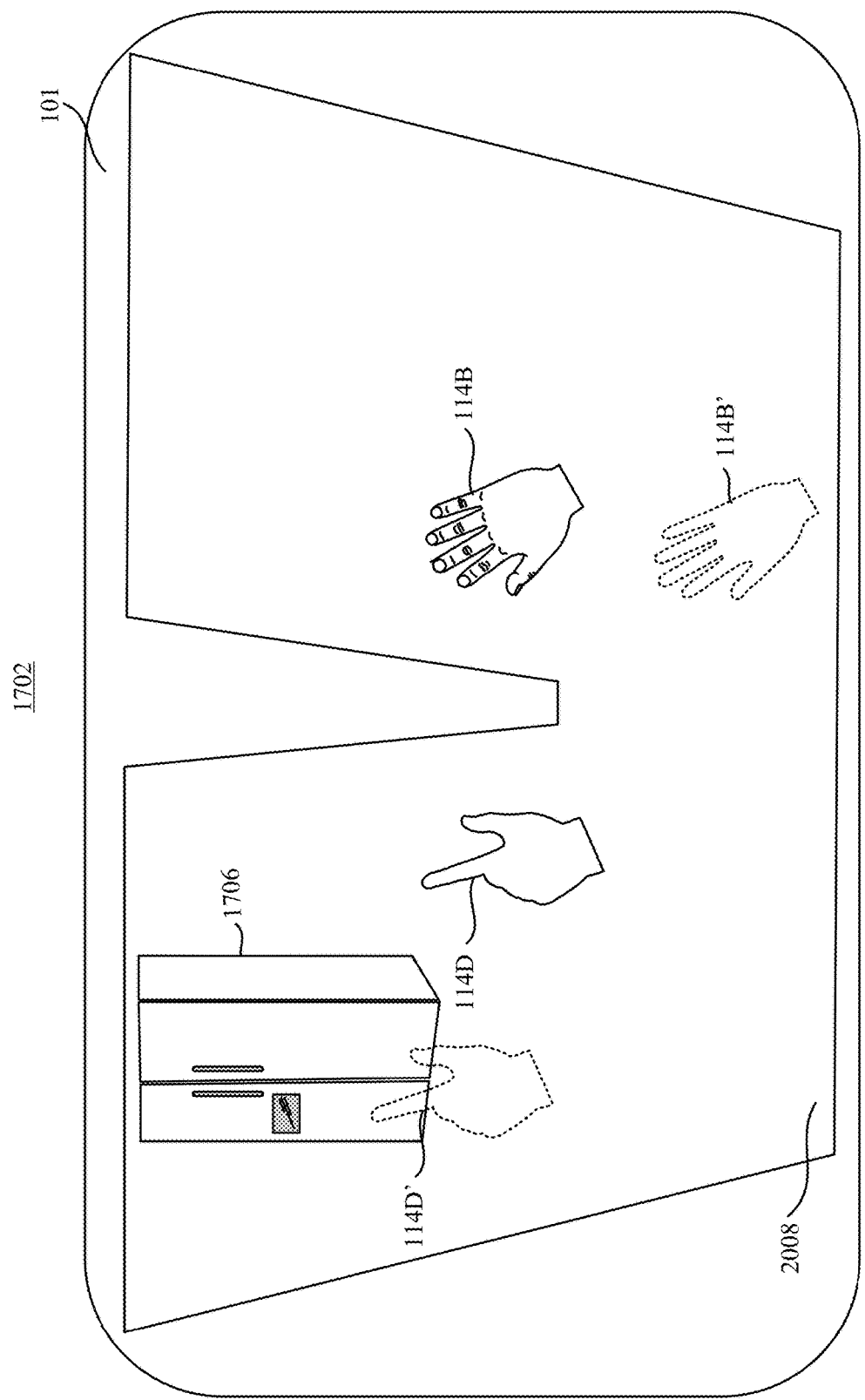
FIG. 20 is one implementation of smoothly transitioning between an immersive virtual environment and a physical real environment by triggering a pass through mode.

FIG. 20 is one implementation of smoothly transitioning between an immersive virtual environment and a physical real environment by triggering a pass through mode 2000 that superimposes at least one virtual object 114D' of the immersive virtual environment 1708 in the physical real environment 1702 to generate data representing a mixed reality environment 2008. Mixed reality environment 2008 combines at least one physical object (like 1706) of a physical real environment (like 1702) with at least one virtual object (like 114D') of an immersive virtual environment (like 1708).

In some implementations, motion capture is achieved using an optical motion-capture system. In some implementations, object position tracking is supplemented by measuring a time difference of arrival (TDOA) of audio signals at the contact vibrational sensors and mapping surface locations that satisfy the TDOA, analyzing at least one image, captured by a camera of the optical motion-capture system, of the object in contact with the surface, and using the image analysis to select among the mapped TDOA surface locations as a surface location of the contact.

Reference may be had to the following sources, incorporated herein by reference, for further information regarding computational techniques:
1. Wikipedia, at http://en.wikipedia.org/wiki/Euclidean_ group, on Nov. 4, 2013, 04:08 UTC;
2. Wikipedia, at http://en.wikipedia.org/wiki/Affine transformation, on Nov. 25, 2013, 11:01 UTC;
3. Wikipedia, at http://en.wikipedia.org/wiki/Rotation_matrix, Rotation matrix from axis and angle, on Jan. 30, 2014, 20:12 UTC;
4. Wikipedia, at http://en.wikipedia.org/wiki/Rotation group SO(3), Axis of rotation, on Jan. 21, 2014, 21:21 UTC;

5. Wikipedia, at http://en.wikipedia.org/wiki/Transformation_matrix, Affine Transformations, on Jan. 28, 2014, 13:51 UTC; and
6. Wikipedia, at http://en.wikipedia.org/wiki/Axis%E2%80%93angle_representation, on Jan. 25, 2014, 03:26 UTC.

While the disclosed technology has been described with respect to specific implementations, one skilled in the art will recognize that numerous modifications are possible. The number, types and arrangement of cameras and sensors can be varied. The cameras' capabilities, including frame rate, spatial resolution, and intensity resolution, can also be varied as desired. The sensors' capabilities, including sensitively levels and calibration, can also be varied as desired. Light sources are optional and can be operated in continuous or pulsed mode. The systems described herein provide images and audio signals to facilitate tracking movement of an object, and this information can be used for numerous purposes, of which position and/or motion detection is just one among many possibilities.

Threshold cutoffs and other specific criteria for distinguishing object from background can be adapted for particular hardware and particular environments. Frequency filters and other specific criteria for distinguishing visual or audio signals from background noise can be adapted for particular cameras or sensors and particular devices. In some implementations, the system can be calibrated for a particular environment or application, e.g., by adjusting frequency filters, threshold criteria, and so on.

Any type of object can be the subject of motion capture using these techniques, and various aspects of the implementation can be optimized for a particular object. For example, the type and positions of cameras and/or other sensors can be selected based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the disclosed technology has been described with respect to specific implementations, it will be appreciated that the disclosed technology is intended to cover all modifications and equivalents within the scope of the following claims.

What is claimed is:

1. A system, including:
a controller including a processor and memory storing instructions that when executed:
provides a head mounted device (HMD) that conducts an augmented hybrid experience with an ability to select between:
(i) an immersive virtual environment that includes a virtual presentation of a virtual object corresponding to a physical object sensed by a sensor that captures an image of a physical real environment; and
(ii) a mixed reality environment that includes a near real time display of at least a part of the physical real environment surrounding a user;
responsive to a first command input, automatically interrupts a presentation of the immersive virtual environment; and
responsive to a second command input, automatically interrupts a presentation of the mixed reality environment and resumes the immersive virtual environment,
wherein the first command input and the second command input are determined using positions of a physical object sensed, by the sensor, at time t0 and time t1, distinguishing motion made by the physical object sensed from motion of the sensor and interpreting the motion made by the sensed physical object to indicate a command.

2. The system of claim 1, wherein a command input is automatically triggered in response to a free-form gesture.

3. The system of claim 1, wherein a command input is automatically triggered in response to an audio signal.

4. The system of claim 1, wherein a command input is automatically triggered in response to a vibrational signal.

5. The system of claim 1, wherein a command input is automatically triggered in response to an optical signal.

6. The system of claim 1, further including, simultaneously, manipulating in response to a command input at least one virtual object of the immersive virtual environment and at least one physical object of the physical real environment during the augmented hybrid experience.

7. A method comprising:
providing to a head mounted device (HMD) that conducts an augmented hybrid experience, an ability to select between:
(i) an immersive virtual environment that includes a virtual presentation of a virtual object corresponding to a physical object sensed by a sensor that captures an image of a physical real environment; and
(ii) a mixed reality environment that includes a near real time display of at least a part of the physical real environment surrounding a user;
responsive to a first command input, automatically interrupting a presentation of the immersive virtual environment; and
responsive to a second command input, automatically interrupting a presentation of the mixed reality environment and resumes the immersive virtual environment;
wherein the first command input and the second command input are determined using positions of a physical object sensed, by the sensor, at time t0 and time t1, distinguishing motion made by the physical object sensed from motion of the sensor, and interpreting the motion made by the sensed physical object to indicate a command.

8. The method of claim 7, wherein the mixed reality environment includes at least one virtual object of the immersive virtual environment and at least one physical object of the physical real environment.

9. The method of claim 7, wherein a command input is automatically triggered in response to a free-form gesture.

10. The method of claim 7, wherein a command input is automatically triggered in response to an audio signal.

11. The method of claim 7, wherein a command input is automatically triggered in response to a vibrational signal.

12. The method of claim 7, wherein a command input is automatically triggered in response to an optical signal.

13. The method of claim 7, the method further comprising:
   interpreting the motion made by the physical object sensed to indicate a third command; and
   automatically triggering a pass-through mode in response to third command input, wherein the pass-through mode interrupts the immersive virtual environment and substitutes a live feed of the physical real environment thereby providing an augmented hybrid experience.

14. A non-transitory computer readable medium storing computer instructions thereon, the computer instructions, when executed by one or more processors, perform a method including:
   providing to a head mounted device (HMD) that conducts an augmented hybrid experience, an ability to select between:
      (i) an immersive virtual environment that includes a virtual presentation of a virtual object corresponding to a physical object sensed by a sensor that captures an image of a physical real environment; and
      (ii) a mixed reality environment that includes a near real time display of at least a part of the physical real environment surrounding a user;
   responsive to a first command input, automatically interrupting a presentation of the immersive virtual environment; and
   responsive to a second command input, automatically interrupting a presentation of the mixed reality environment and resuming the immersive virtual environment;
   wherein the first command input and the second command input are determined using positions of a physical object sensed, by the sensor, at time t0 and time t1, distinguishing motion made by the physical object sensed from motion of the sensor, and interpreting the motion made by the sensed physical object to indicate a command.

15. The non-transitory computer readable medium of claim 14, wherein the mixed reality environment includes at least one virtual object of the immersive virtual environment and at least one physical object of the physical real environment.

16. The non-transitory computer readable medium of claim 14, wherein a command input is automatically triggered in response to a free-form gesture.

17. The non-transitory computer readable medium of claim 14, wherein a command input is automatically triggered in response to a vibrational signal or an audio signal or an optical signal.

18. The non-transitory computer readable medium of claim 14, further comprising instructions that perform:
   interpreting the motion made by the physical object sensed to indicate a third command; and
   automatically triggering a pass-through mode in response to third command input, wherein the pass-through mode interrupts the immersive virtual environment and substitutes a live feed of the physical real environment thereby providing an augmented hybrid experience.

* * * * *